(12) United States Patent
Hanson et al.

(10) Patent No.: US 10,207,444 B2
(45) Date of Patent: Feb. 19, 2019

(54) DIVERTER VALVE

(71) Applicant: Processing Technologies International, LLC, Aurora, IL (US)

(72) Inventors: Dana R. Hanson, St. Charles, IL (US); Mitchell L. Gritzner, Montgomery, IL (US)

(73) Assignee: Processing Technologies, LLC, Aurora, IL (US)

( * ) Notice: Subject to any disclaimer, the term of this patent is extended or adjusted under 35 U.S.C. 154(b) by 203 days.

(21) Appl. No.: 15/048,456

(22) Filed: Feb. 19, 2016

(65) Prior Publication Data
US 2016/0243743 A1    Aug. 25, 2016

Related U.S. Application Data

(60) Provisional application No. 62/118,818, filed on Feb. 20, 2015.

(51) Int. Cl.
| | |
|---|---|
| *B29C 47/08* | (2006.01) |
| *F16K 11/085* | (2006.01) |
| *B29C 47/12* | (2006.01) |
| *B29C 47/14* | (2006.01) |
| *B29C 47/06* | (2006.01) |
| *B29C 47/00* | (2006.01) |

(52) U.S. Cl.
CPC ...... *B29C 47/0811* (2013.01); *B29C 47/0816* (2013.01); *F16K 11/085* (2013.01); *B29C 47/0009* (2013.01); *B29C 47/065* (2013.01); *B29C 47/0874* (2013.01); *B29C 47/124* (2013.01); *B29C 47/128* (2013.01); *B29C 47/145* (2013.01)

(58) Field of Classification Search
CPC ............ B29C 47/0811; B29C 47/0816; B29C 47/0009; B29C 47/0874; B29C 47/124; B29C 47/145; B29C 47/065; B29C 47/128; F16K 11/085
See application file for complete search history.

(56) References Cited

U.S. PATENT DOCUMENTS

| | | | |
|---|---|---|---|
| 3,886,963 A | 6/1975 | Jones et al. | |
| 4,164,956 A | 8/1979 | Takahashi et al. | |
| (Continued) | | | |

FOREIGN PATENT DOCUMENTS

WO   WO 2014060992 A1 *   4/2014 ............ B29C 47/56

*Primary Examiner* — Matthew W Jellett
*Assistant Examiner* — Christopher Ballman
(74) *Attorney, Agent, or Firm* — Wood, Phillips, Katz, Clark & Mortimer

(57) ABSTRACT

A diverter valve for extruded materials, including a split cylinder in the cylindrical opening of a base, each cylinder half being independently pivotable. The base includes first and second inlets for first and second extruded material, and first and second outlets for the material. Base first and second flow paths carry the first and second extruded materials from the inlets to the output openings, and third and fourth flow paths carry extruded material from the first and second first inlet openings to the first and second outlets. The first and second inlet openings and the first and second output openings are axially open to the central opening, and the cylinder halves are adjacent along a plane substantially radial to the central opening axis with each of the cylinder halves including a recess open along the radial plane.

15 Claims, 21 Drawing Sheets

(56) References Cited

U.S. PATENT DOCUMENTS

| | | |
|---|---|---|
| 4,234,015 A | 11/1980 | Kintner |
| 4,358,261 A | 11/1982 | Ohki |
| 4,931,246 A | 6/1990 | Kudert et al. |
| 5,076,777 A | 12/1991 | Schmitt |
| 5,110,276 A | 5/1992 | Farnsworth et al. |
| 5,616,350 A | 4/1997 | Wissmann et al. |
| 5,711,349 A | 1/1998 | Wissmann |
| 5,773,037 A | 6/1998 | Geider et al. |
| 5,858,420 A | 1/1999 | Szajak et al. |
| 6,174,478 B1 | 1/2001 | Silver |
| 8,490,643 B2 * | 7/2013 | Hanson ................ B29C 47/062 137/240 |
| 2004/0159964 A1 | 8/2004 | Lavoie et al. |
| 2004/0213983 A1 | 10/2004 | Nodono et al. |
| 2006/0118186 A1 | 6/2006 | Gaget et al. |
| 2015/0332814 A1 * | 11/2015 | Gumina ................ B29C 47/56 118/419 |

\* cited by examiner

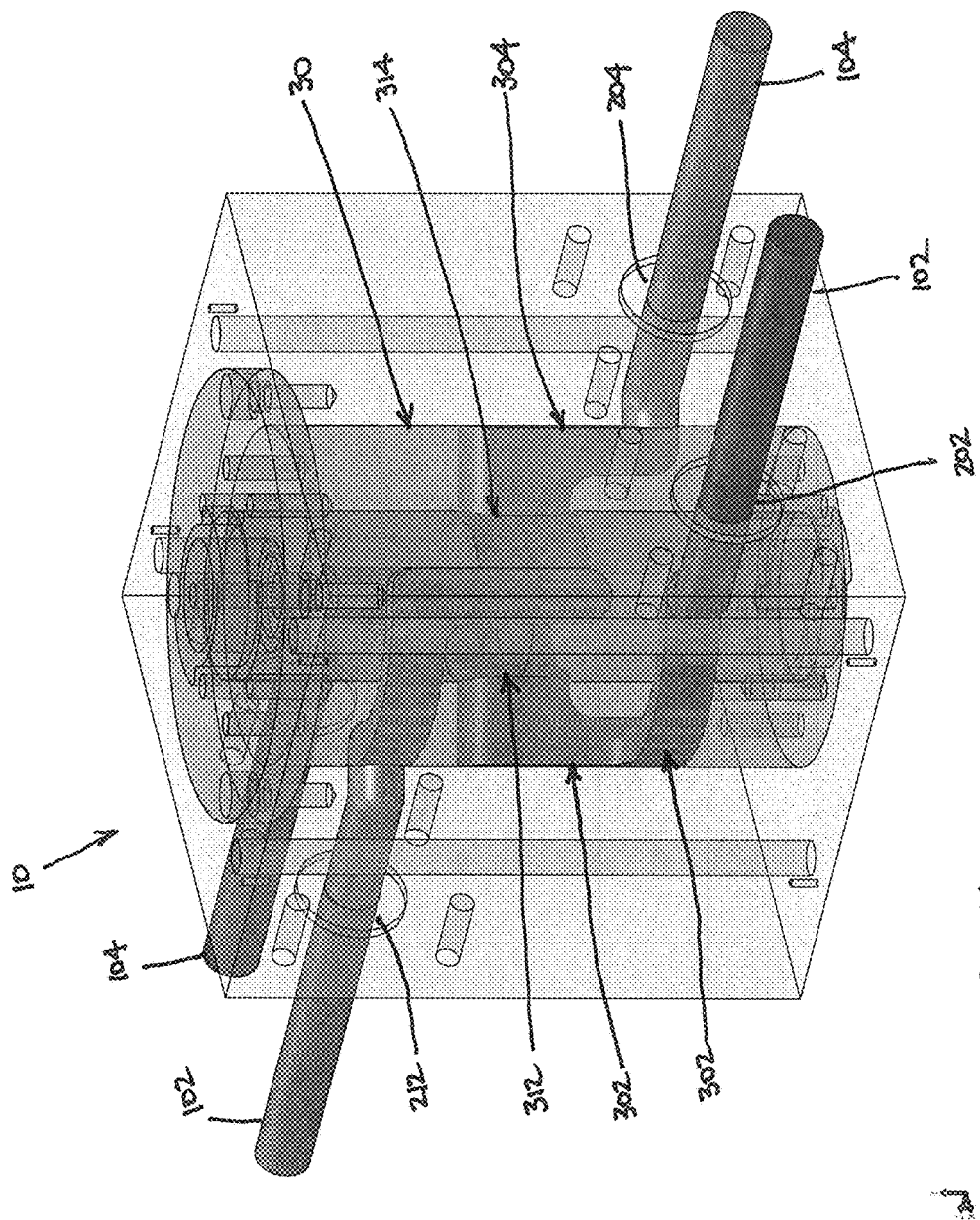

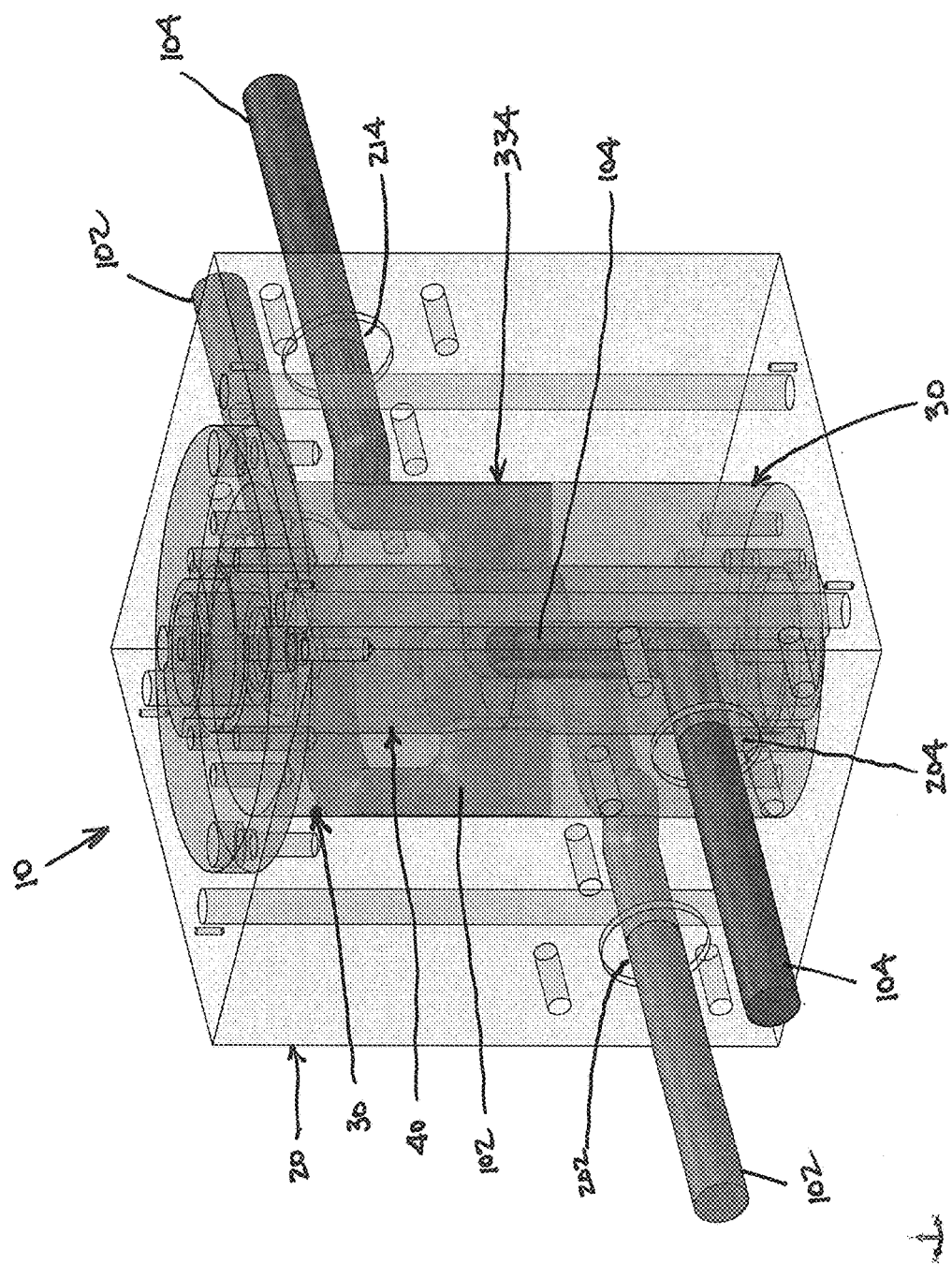

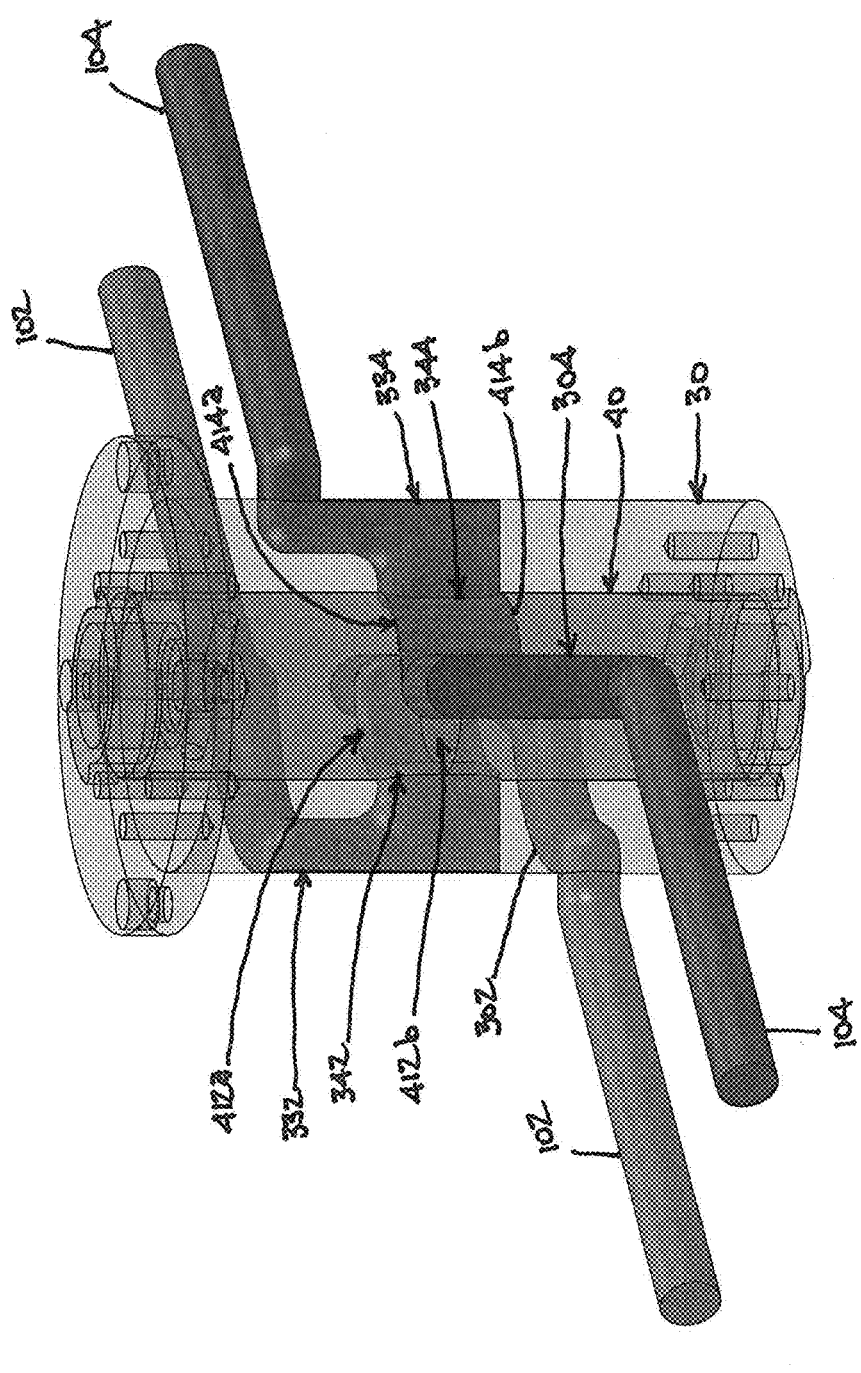

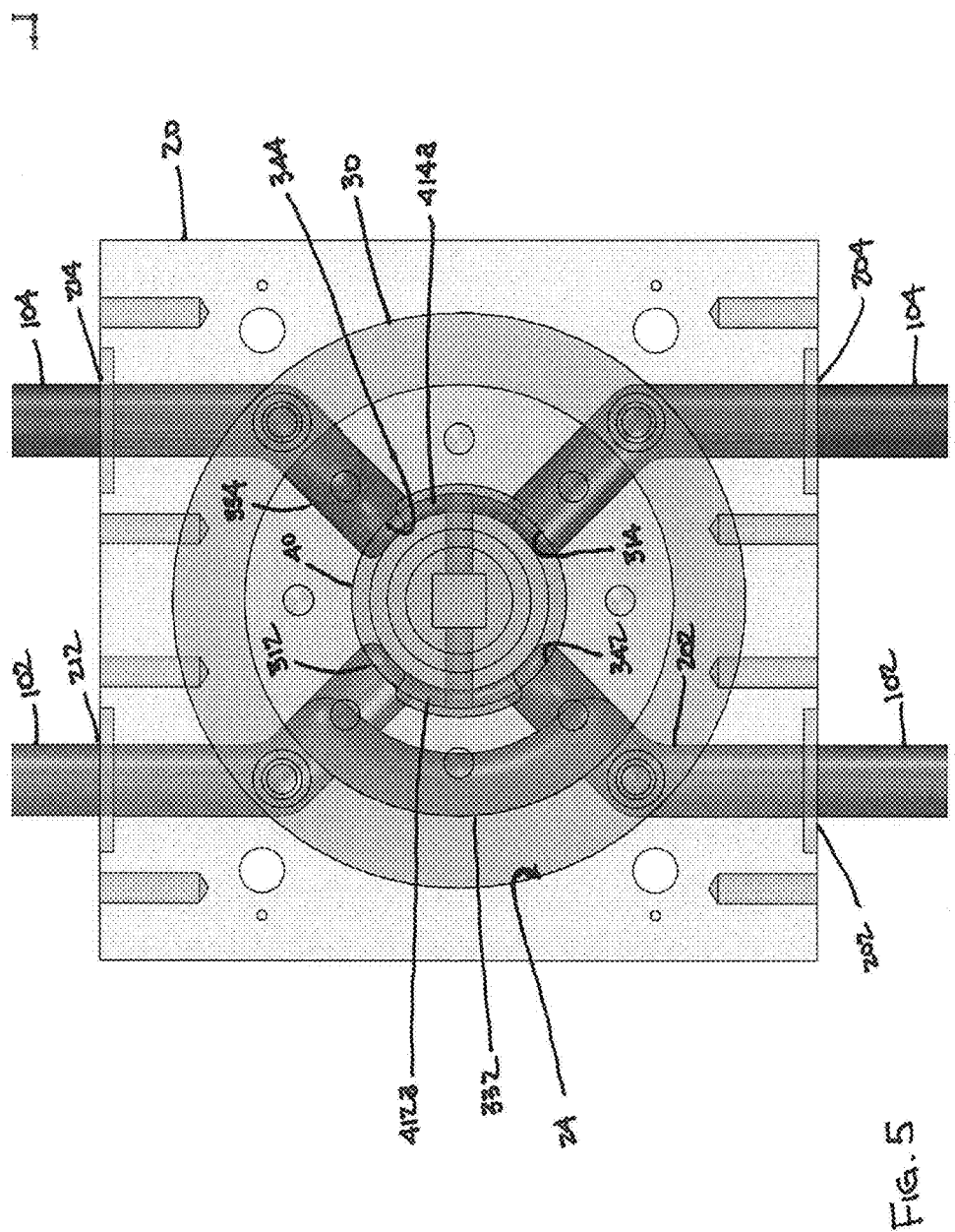

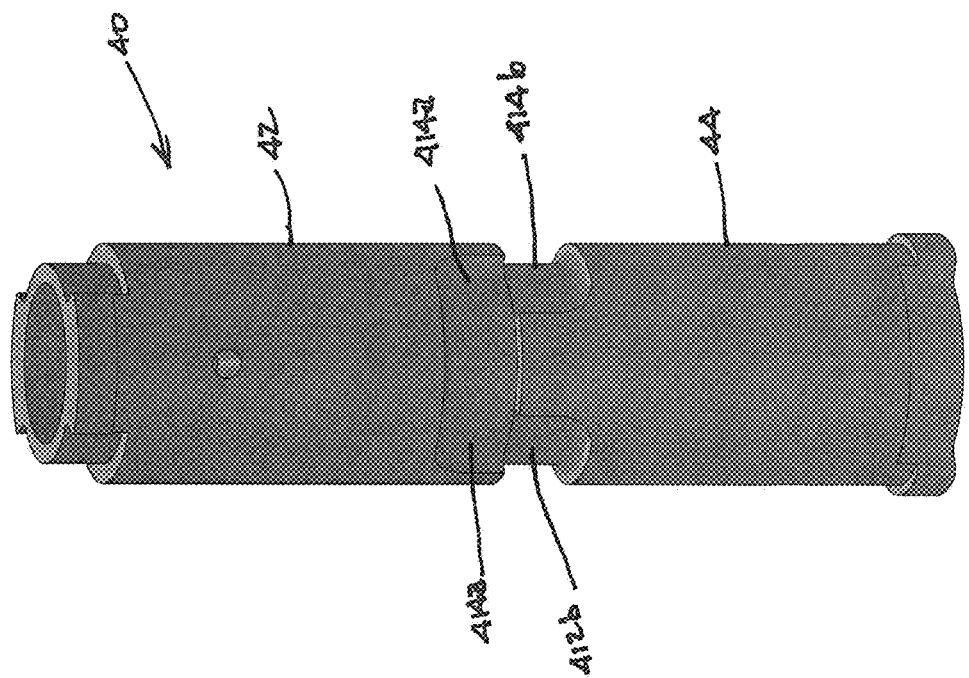

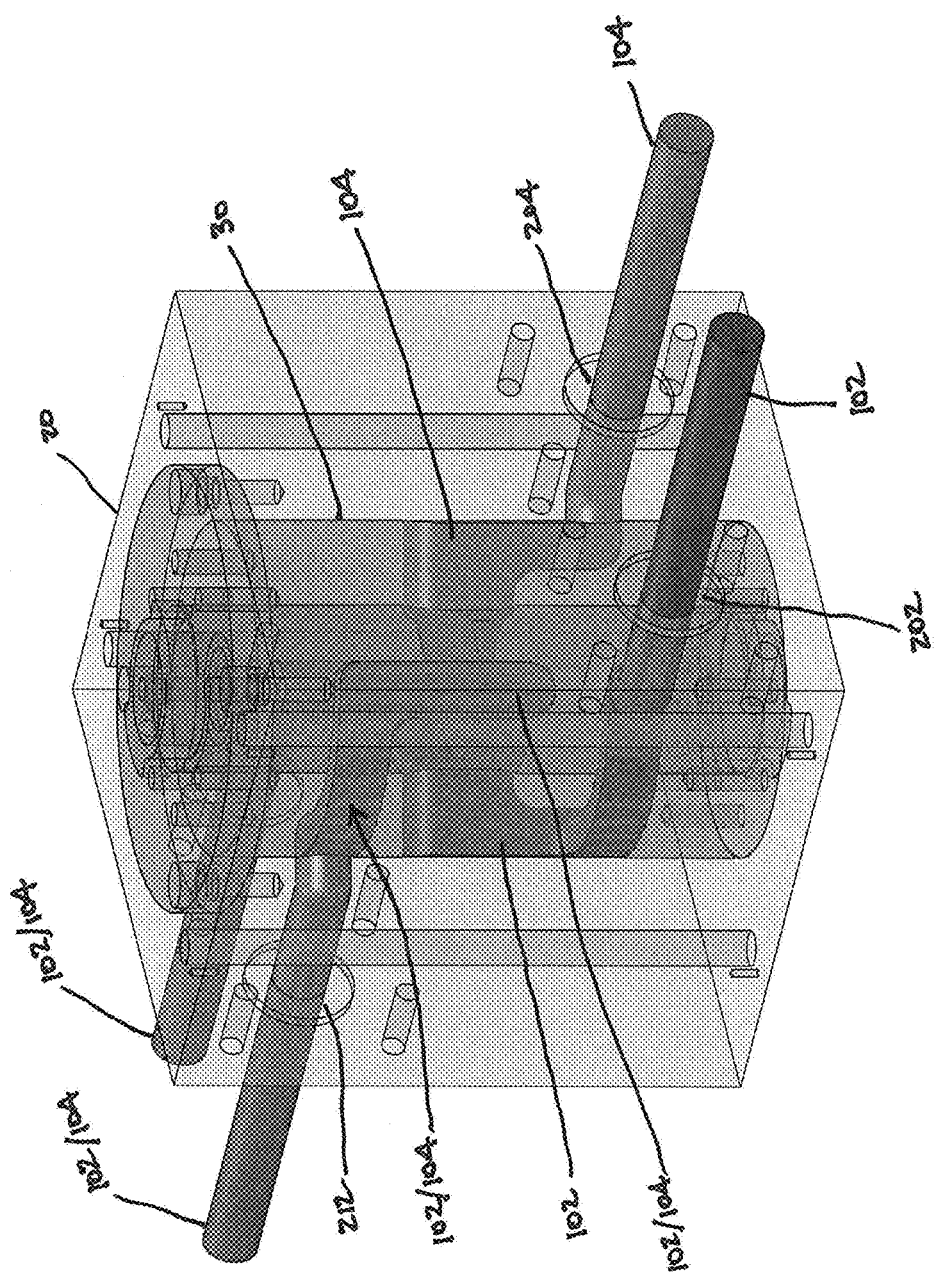

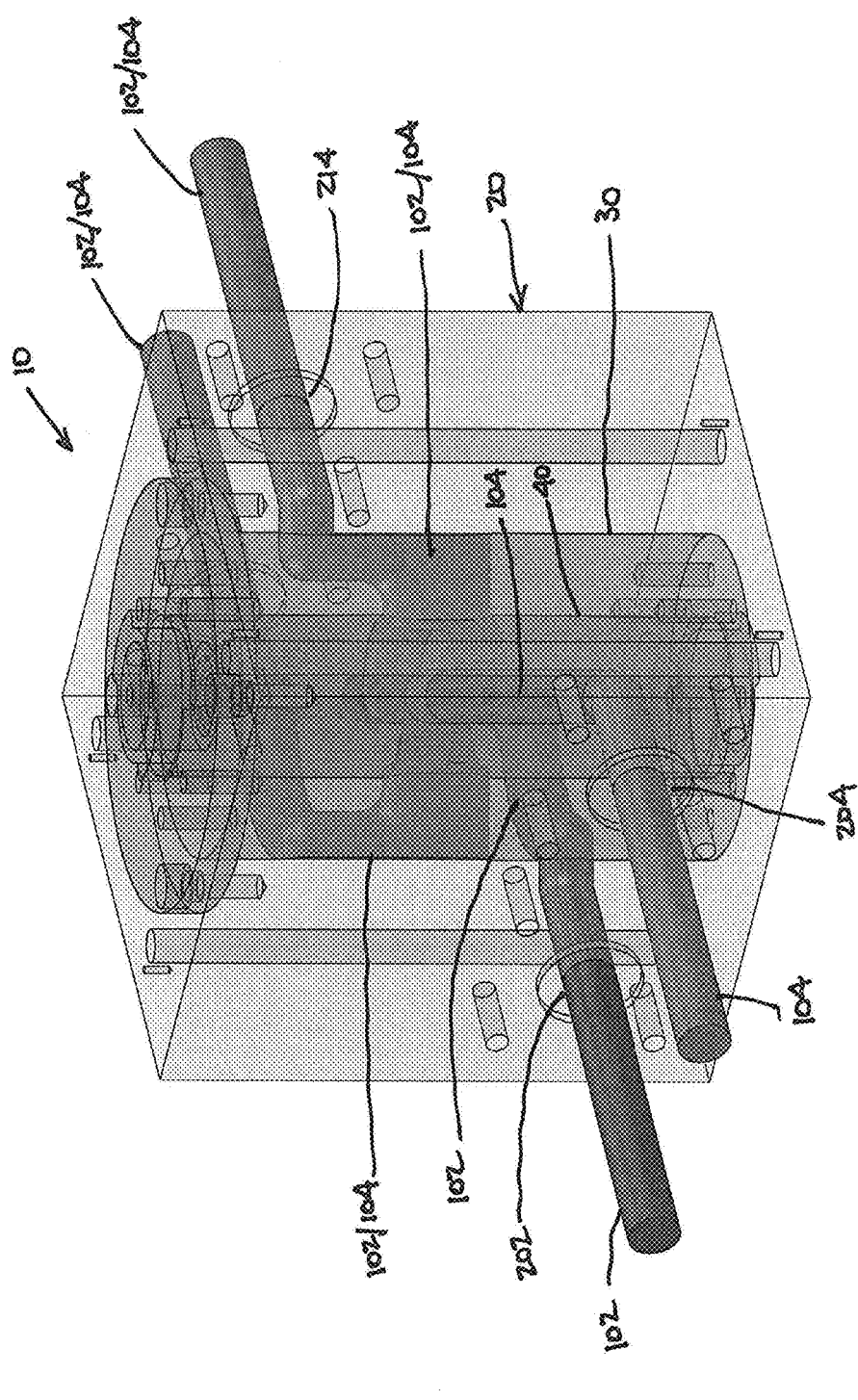

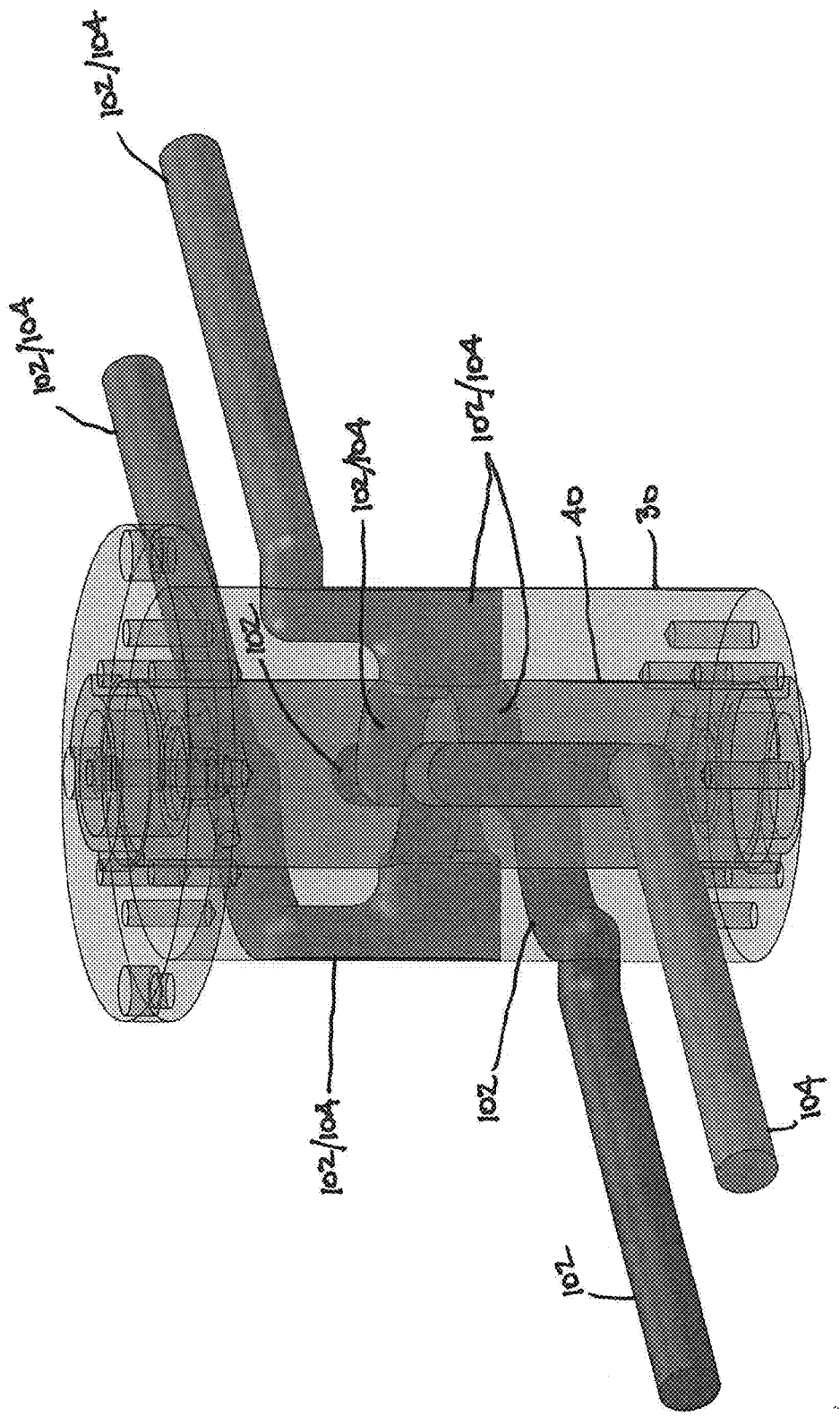

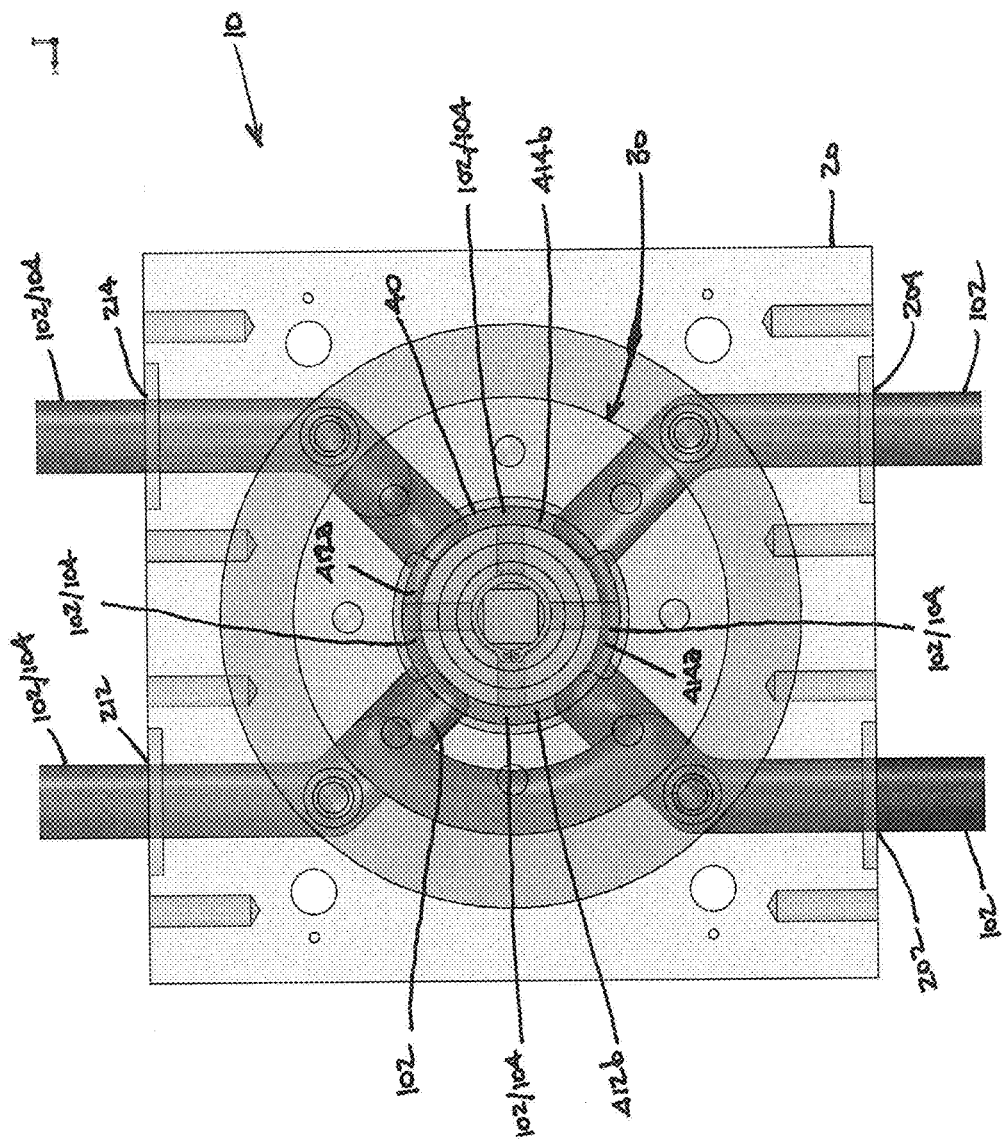

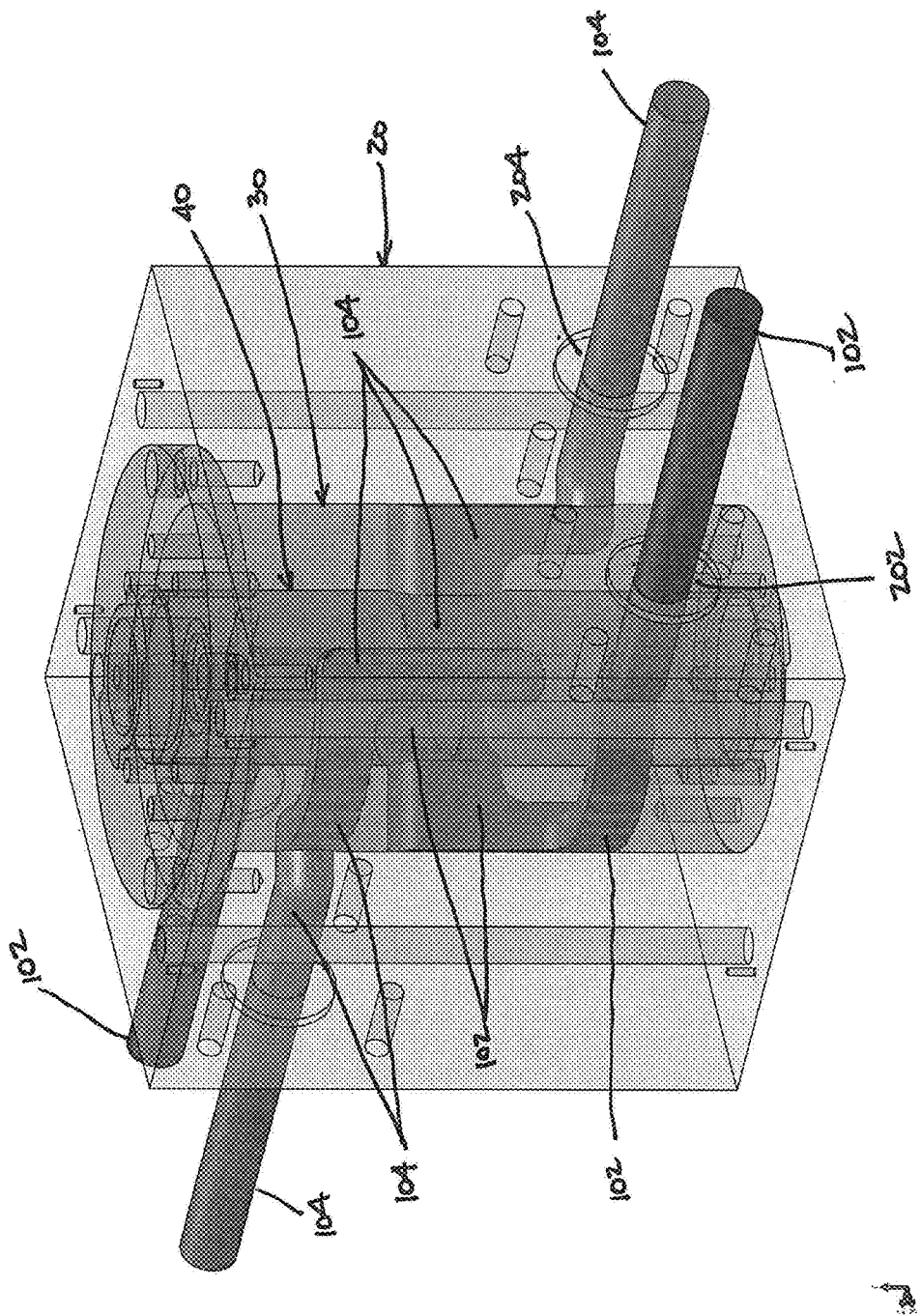

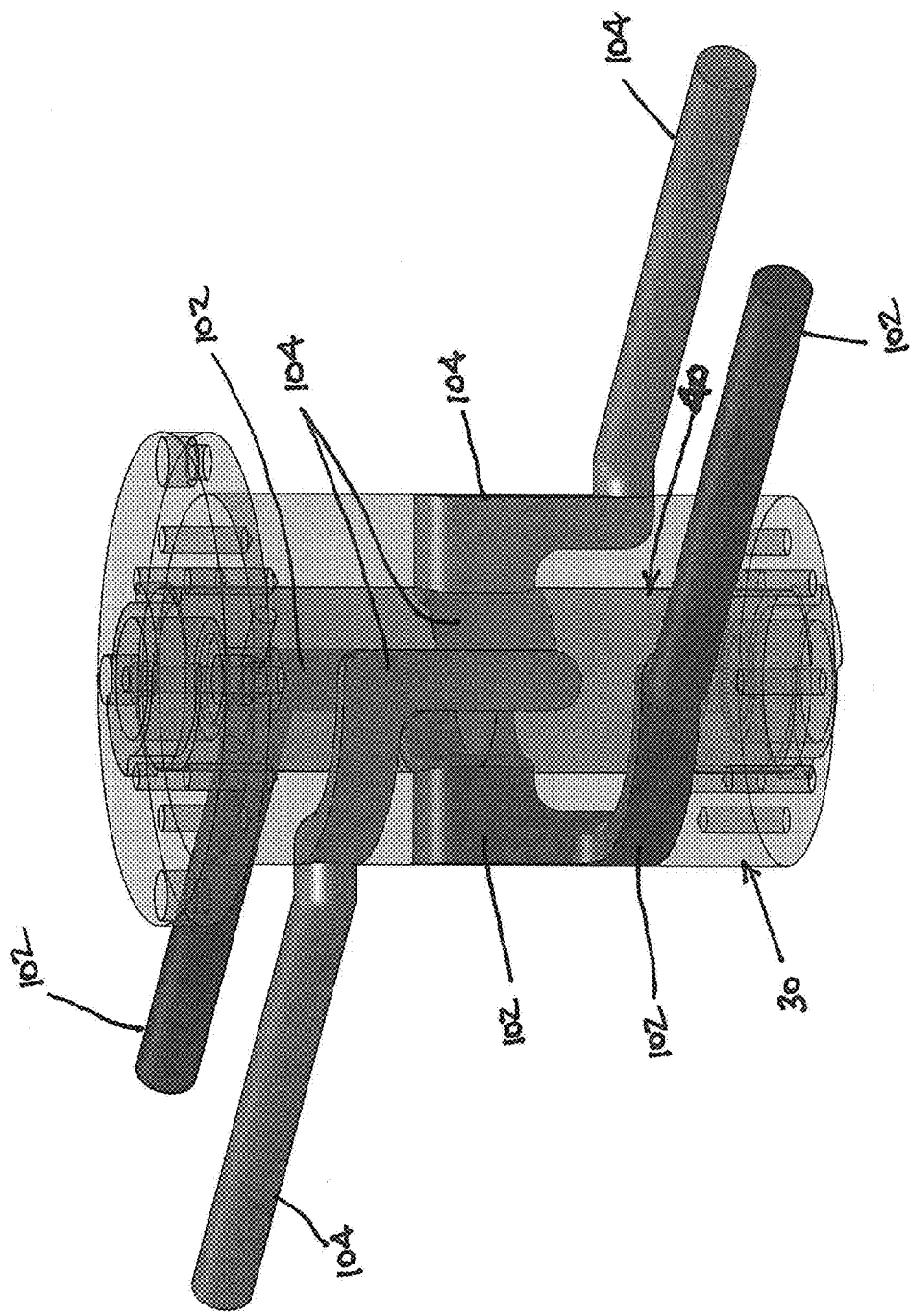

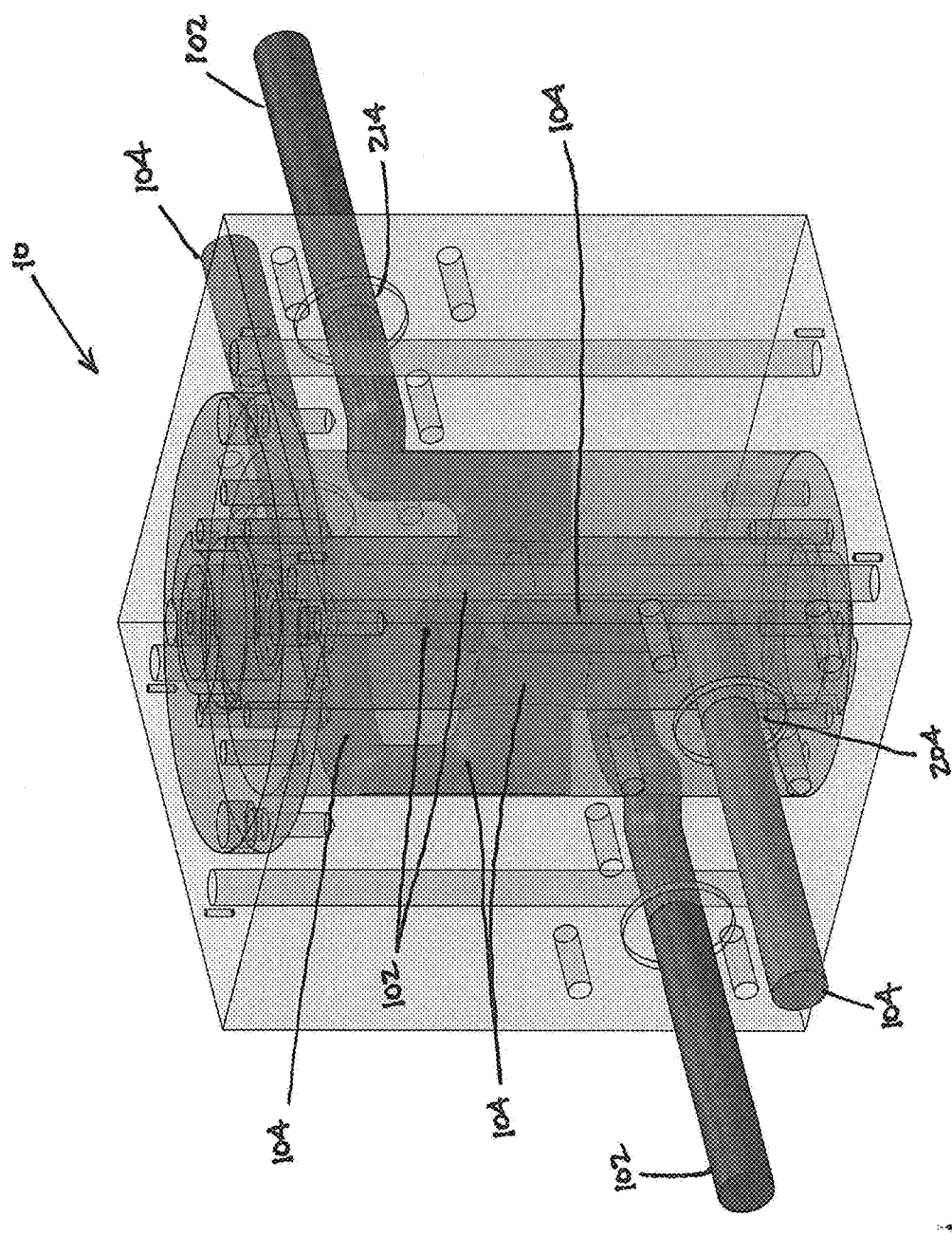

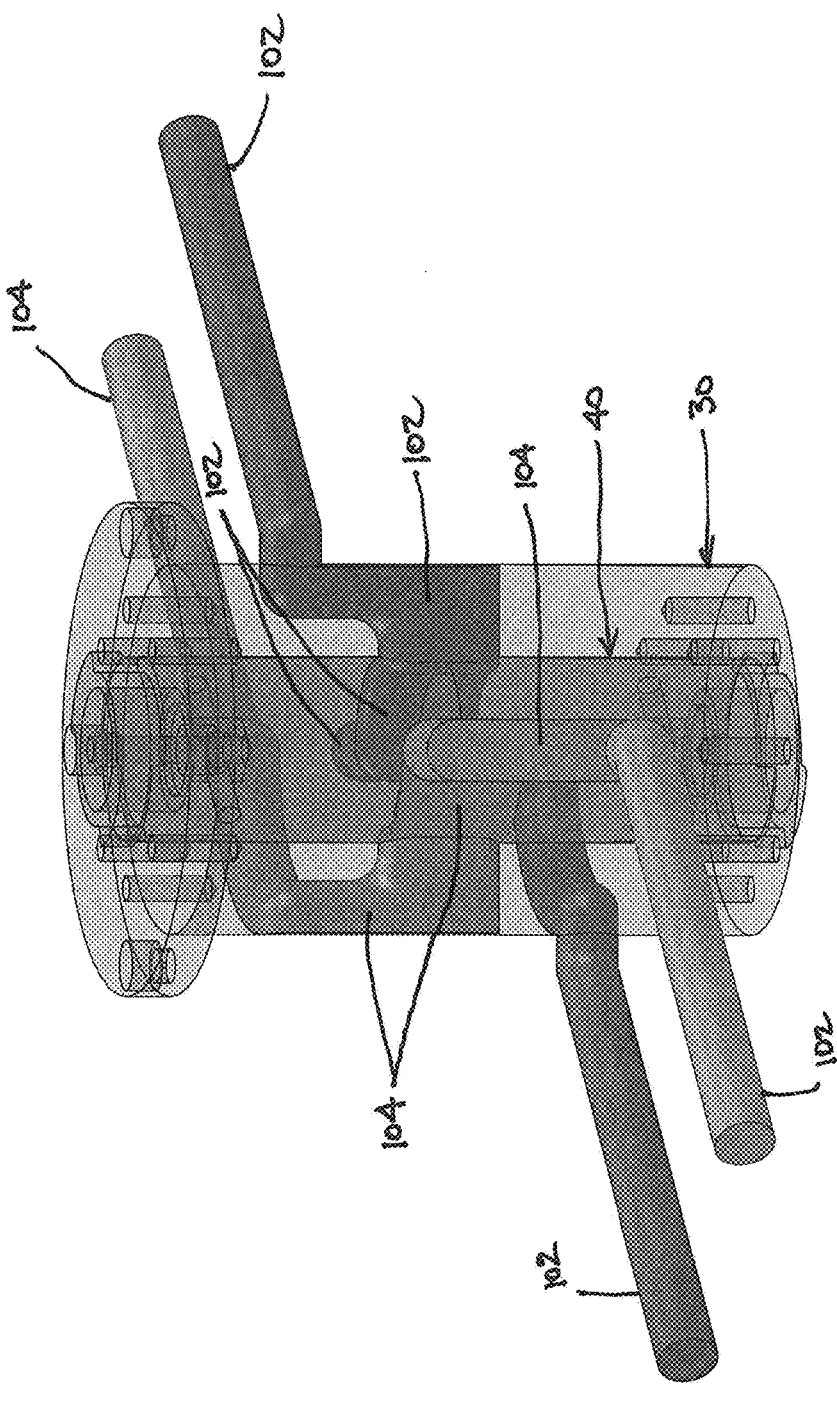

DIVERTER VALVE

CROSS-REFERENCE TO RELATED APPLICATIONS

This is a non-provisional application claiming priority to U.S. Provisional Application Ser. No. 62/118,818, entitled "Diverter Valve" and filed on Feb. 20, 2015.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention is related to continuous molding using multiple extruded materials, and more particularly to diverter valves for swapping the extruded materials between mold inputs.

BACKGROUND OF THE INVENTION

Molding of extruded materials to form countless products is widely done. As is well known, an extruder is used to provide the extruded material to a suitable die in which the extruded material is shaped to create the desired object. Commonly, the object which is created has a uniform continuous shape, such as conduits, pipes and flat sheets.

Extruded sheets, for example, may be formed from many different materials, with many different thicknesses, and with different layer constructions. An extruded sheet may be formed by itself or combined with one or more other sheet layers that are concurrently formed, or combined after formation. In a typical apparatus for extrusion forming of sheet products, a roll stand is placed downstream of an extruder assembly with an associated sheet die. Flowable material is delivered from one or more extruders through the sheet die to a nip/lamination location between adjacent rolls on the roll stand.

Apparatuses for forming an extruded sheet products are shown, for example, in my U.S. Pat. No. 8,240,180, entitled "Height Positioning Mechanism for Roll Stand Assembly on an Apparatus for Continuously Forming an Extruded Sheet Product"; U.S. Pat. No. 8,021,140, entitled "Linear Bearing Assembly to Guide Movement of Roll Stand on Apparatus for Forming an Extruded Sheet Product"; U.S. Pat. No. 8,152,509, entitled "Gap Adjusting Mechanism for Rolls on a Roll Stand Used in the Extrusion Forming of a Sheet Product"; and U.S. Published Patent Application No. US-2010-0038037-A1, entitled "Apparatus for Applying a Film to a Bottom Side of an Extruded Sheet". The disclosures of all of these patent applications are hereby fully incorporated by reference.

Moreover, various products, including sheet products, can require the use of two separate materials, such as shown, for example, in U.S. Publ. Application No. US-2008-0314525-A1, entitled "Web Lamination System", the disclosure of which is hereby fully incorporated by reference. Molding of such products requires the supply of material from at least a first extruder assembly and a second extruder assembly, with a first material provided by one and a second material provided by the other. It should be appreciated that use two different materials may from time to time be switched. For example, when the two materials differ in color, or in texture, it may be desirable to form a product (e.g., a sheet material) having one color or texture on its outer skin, and also to form a similar product but with the other color or texture on its outer skin. This may be accomplished by swapping the connection between the outputs of the extruder assemblies to the inputs of the mold.

It should be appreciated, however, that swapping connections with continuous products may be most advantageously accomplished while molding continues, that is, while molding of the product continues. Moreover, it should be appreciated that continuing molding while swapping connections can result in bleed over and mixing of materials in the lines between the extruder assemblies and the mold. If, for example, one of the materials is hidden on the interior of a sheet, covered by the other material on the skin of the sheet, such mixing of materials in the unseen interior of the sheet may not be a major concern. However, similar mixing of the material which is molded to form the skin of the sheet can cause the sheet to have a different visible color than desired, either through some mixing of the colors or a speckling of one color with the other. Such an appearance is not only not what is desired, but it can give the appearance that the sheet was poorly manufactured, and possibly make the sheet unacceptable to a buyer. Therefore it is desirable to minimize the amount of molded product having mixed materials.

My U.S. Pat. No. 8,490,643 discloses a diverter valve which overcomes one or more of the problems set forth above, as it may be used to provide advantageous operation whereby continuous molding may be done even while swapping extruders between multiple inputs. The present invention is directed to advantageously accomplishing the same.

SUMMARY

The disclosed diverter valve controls input of supplies of first and second extruded materials to a mold for molding products including both extruded materials. The valve has two inlets and two outlets, and is configured to change between a first state wherein the first inlet is connected to the first outlet and the second inlet is connected to the second outlet, and a second state (FIGS. 2 and 5) wherein the first inlet is connected to the second outlet and the second inlet is connected to the first outlet. The diverter valve is configured so that when switching from the first state to the second state, the first inlet is connected to the second outlet before disconnecting from the first outlet, and the second inlet is connected to the first outlet before disconnecting from the second outlet, and when switching the diverter valve from the second state to the first state, the first inlet is connected to the first outlet before disconnecting from the second outlet, and the second inlet is connected to the second outlet before disconnecting from the first outlet.

In one aspect of the present invention, a diverter valve is provided for controlling input of supplies of first and second extruded materials to a mold. The valve includes a base having a central opening cylindrical about an axis, and a cylinder pivotable about the axis in the base cylindrical central opening. The base includes first and second inlets for first and second extruded material, and first and second outlets adapted to output extruded material to first and second mold inlets. The base has a first flow path adapted to carry the first extruded material from the first inlet to a first output opening, a second flow path adapted to carry a second extruded material from the second inlet to a second output opening, a third flow path adapted to carry extruded material from a first inlet opening to the first outlet, and a fourth flow path adapted to carry extruded material from a second inlet opening to the second outlet, with the first and second inlet openings and the first and second output openings axially open to the central opening. The cylinder has first and second recesses around its outer surface axially aligned with first and second inlet openings and the first and second output openings.

In one form, when extruded material is supplied to the diverter valve, the material constantly flows through the entirety of the first, second, third and fourth flow paths and the first and second recesses.

In another form, the cylinder is rotatable between first and second states. The first recess is open to the first output opening, and extends around the cylinder sufficiently whereby, (a) in the first state the first recess is open to the first inlet opening, (b) in the second state the first recess is open to the second inlet opening, (c) when transitioning from the first state to the second state the first recess becomes open to the second inlet opening before closing from the first inlet opening, and (d) when transitioning from the second state to the first state the first recess becomes open to the first inlet opening before closing from the second inlet opening. The second recess is open to the second output opening, and extends around the cylinder sufficiently whereby, (a) in the first state the second recess is open to the second inlet opening, (b) in the second state the second recess is open to the first inlet opening, (c) when transitioning from the first state to the second state the second recess becomes open to the first inlet opening before closing from the second inlet opening, and (d) when transitioning from the second state to the first state becomes open to the second inlet opening before closing from the first inlet opening.

In an alternate form, the cylinder is rotatable between first and second states. The first recess is open to the first inlet opening and the second recess open to the second inlet opening. The first recess extends around the cylinder sufficiently whereby, (a) in the first state the first recess is open to the first output opening, (b) in the second state the first recess is open to the second output opening, (c) when transitioning from the first state to the second state the first recess becomes open to the second output opening before closing from the first output opening, and (d) when transitioning from the second state to the first state the first recess becomes open to the first output opening before closing from the second output opening. The second recess extends around the cylinder sufficiently whereby (a) in the first state the second recess is open to the second output opening, (b) in the second state the second recess is open to the first output opening, (c) when transitioning from the first state to the second state the second recess becomes open to the first output opening before closing from the second output opening, and (d) when transitioning from the second state to the first state becomes open to the second output opening before closing from the first output opening.

In still another form, the cylinder has first and second halves independently pivotable about the axis in the base cylindrical central opening, the cylinder halves being adjacent along a plane substantially radial to the central opening axis with each of the cylinder halves including a recess open along the radial plane.

In yet another form, the base first and second output openings and the base first and second inlet openings axially overlap the cylinder recesses. In a further form, the inlets are axially spaced on one side of the cylinder recesses and the outlets are axially spaced on the other side of the cylinder recesses.

In another form, the base first and second output openings are open to opposite sides of the central opening.

In still another form, the base first and second inlet openings are open to opposite sides of the central opening. In a further form, the first and second output openings are open to opposite sides of the central opening and spaced around the base central opening substantially equally between the first and second inlet openings.

In yet another form, the cylinder recesses extend more than 180 degrees around the cylinder.

In another form the first and second cylinder halves are selectively pivotable to selectively connect each of the first and second flow paths with at least one of the third and fourth flow paths.

In still another form, the valve is configured to change between (a) a first state wherein the first inlet is connected to the first outlet and the second inlet is connected to the second outlet, and (b) a second state wherein the first inlet is connected to the second outlet and the second inlet is connected to the first outlet, wherein the diverter valve is configured so that (1) when switching the diverter valve from the first state to the second state, the first inlet is connected to the second outlet before disconnecting from the first outlet and the second inlet is connected to the first outlet before disconnecting from the second outlet, and (2) when switching the diverter valve from the second state to the first state, the first inlet is connected to the first outlet before disconnecting from the second outlet and the second inlet is connected to the second outlet before disconnecting from the first outlet. In a further form, the cylinder recesses are aligned with one another when the valve is in either of the first and second states. In a still further form, the cylinder has first and second halves independently pivotable about the axis in the base cylindrical central opening, the cylinder halves being adjacent along a plane substantially radial to the central opening axis with each of the cylinder halves including a recess open along the radial plane, with the cylinder halves being pivotable through 90 degrees, whereby (i) when switching the diverter valve from the first state to the second state, one of the cylinder halves is first pivoted 90 degrees in one direction and the other of the cylinder halves is thereafter pivoted 90 degrees in the one direction, and (ii) when switching the diverter valve from the second state to first state, one of the cylinder halves is first pivoted 90 degrees in the direction opposite the one direction and the other of the cylinder halves is thereafter pivoted 90 degrees in the opposite direction.

In yet another form, the base comprises a tubular body inside a valve body wherein the tubular body inner surface is the cylindrical opening and the flow paths are in part defined by space between the tubular body and the valve body.

In another aspect of the invention, a diverter valve is provided for controlling input of supplies of first and second extruded materials to a mold, including a base having a central opening cylindrical about an axis, and a cylinder pivotable about the axis in the base cylindrical central opening. The base has first and second inlet openings and first and second output openings open to the central opening, with first and second flow paths through the base adapted to carry first and second extruded material to the first and second output openings, and third and fourth flow paths through the base adapted to carry extruded material from the first and second inlet openings to inlets of a mold. The cylinder has first and second recesses around its outer surface axially aligned with the first and second inlet openings and the first and second output openings.

In one form, when extruded material is supplied to the diverter valve, the material constantly flows through the entirety of the first, second, third and fourth flow paths and the first and second recesses.

In another form, the base first and second output openings and the base first and second inlet openings axially overlap the cylinder recesses. In a further form, the base first and second output openings are open to opposite sides of the central opening, and the base first and second inlet openings are open to opposite sides of the central opening, the input and output openings being spaced about 90 degrees from each other. In a further form, the cylinder recesses extend more than 180 degrees around the cylinder.

In still another form, the cylinder has first and second halves independently pivotable about the axis in the base cylindrical central opening, the cylinder halves being adjacent along a plane substantially radial to the central opening axis with each of the cylinder halves including a recess open along the radial plane. The first and second cylinder halves are selectively pivotable to selectively connect each of the first and second flow paths with at least one of the third and fourth flow paths.

In another aspect of the invention, a diverter valve is provided for controlling input of supplies of first and second extruded materials to a mold, including a base having a central opening cylindrical about an axis and a cylinder having first and second halves pivotable through 90 degrees about the axis in the base cylindrical central opening. The base has first and second inlet openings and first and second output openings open to the central opening, with first and second flow paths through the base adapted to carry the first and second extruded material to the first and second output openings, and third and fourth flow paths through the base to carry extruded material from the first and second inlet openings to first and second inlets of a mold. The base first and second output openings are open to opposite sides of the central opening, and the base first and second inlet openings are open to opposite sides of the central opening, with the input openings being spaced about 90 degrees from the output openings. The cylinder halves are selectively pivotable to selectively connect each of the first and second flow paths with at least one of the third and fourth flow paths. The cylinder halves also are adjacent along a plane substantially radial to the central opening axis with each of the cylinder halves including a recess extend more than 180 degrees around the cylinder and axially open to the recess of the other cylinder half along the radial plane. The base first and second output openings and the base first and second inlet openings axially overlap the cylinder recesses.

Other objects, features, and advantages of the invention will become apparent from a review of the entire specification, including the appended claims and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A is a view of the diverter valve of FIG. 1 wherein components are shown semi-transparently to illustrate interior passages in the diverter valve;

FIG. 3A is a view similar to FIG. 2A, but from a different orientation;

FIG. 3B is a view similar to FIG. 3A, but with the valve body removed;

FIG. 5 is a top view of the diverter valve in the configuration as in FIGS. 1A-4, wherein components are shown semi-transparently to illustrate interior passages in the diverter valve;

FIG. 6 is a view similar to FIG. 4, but with the upper half of the central cylinder pivoted as during transition between valve configurations;

FIGS. 7A, 7B, 8A, 8B and 9 are views similar to FIGS. 2A, 2B, 3A, 3B and 5, respectively, but showing the valve in the transitional configuration away from the straight through configuration of FIGS. 1-5; and FIGS. 10A, 10B, 11A, 11B, 12A, 12B and 13 are views similar to FIGS. 1A, 1B, 2A, 2B, 3A, 3B and 5, but showing the valve in the cross-over configuration following the transition of FIGS. 6-9.

DETAILED DESCRIPTION OF THE PREFERRED EMBODIMENT

Figure 1A:
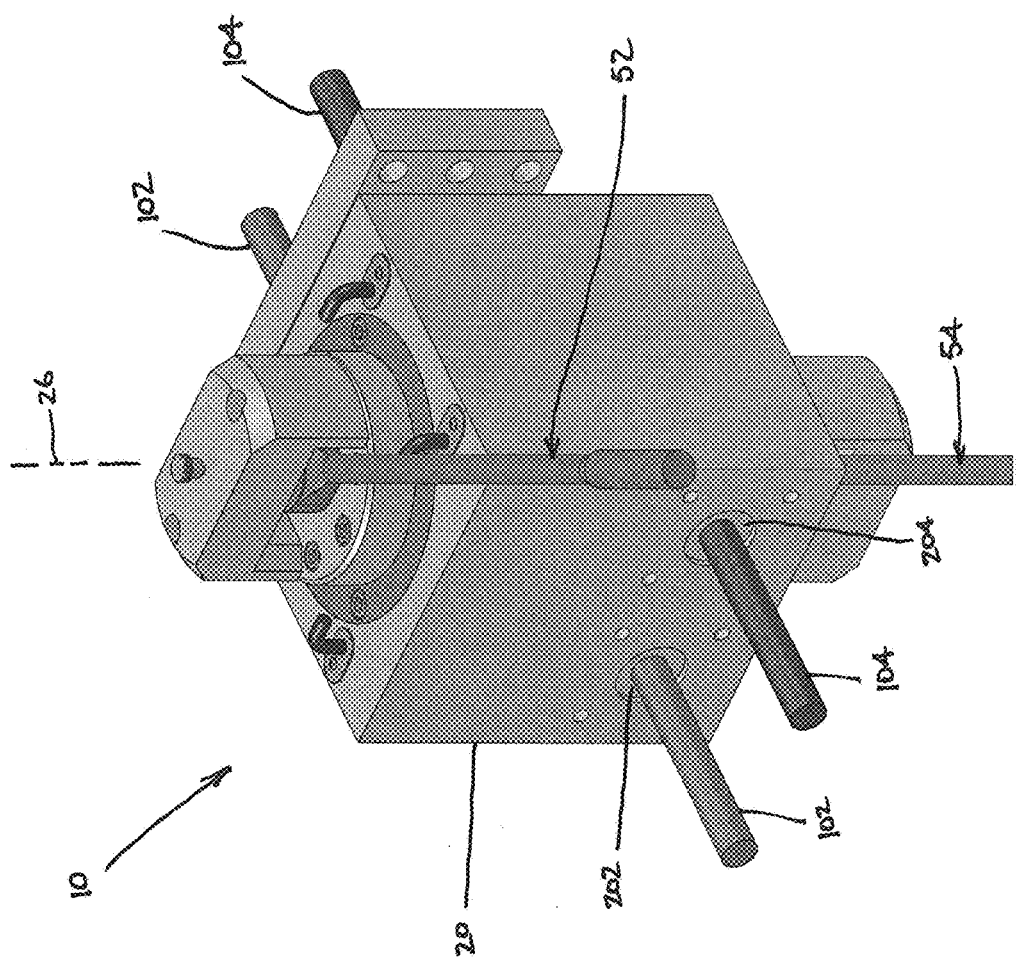
FIG. 1A is a perspective view of a diverter valve and control rods according to the present invention in a first (straight through) configuration, with the extruded material flowing through the valve shown at the input and output.
Figure 1B:
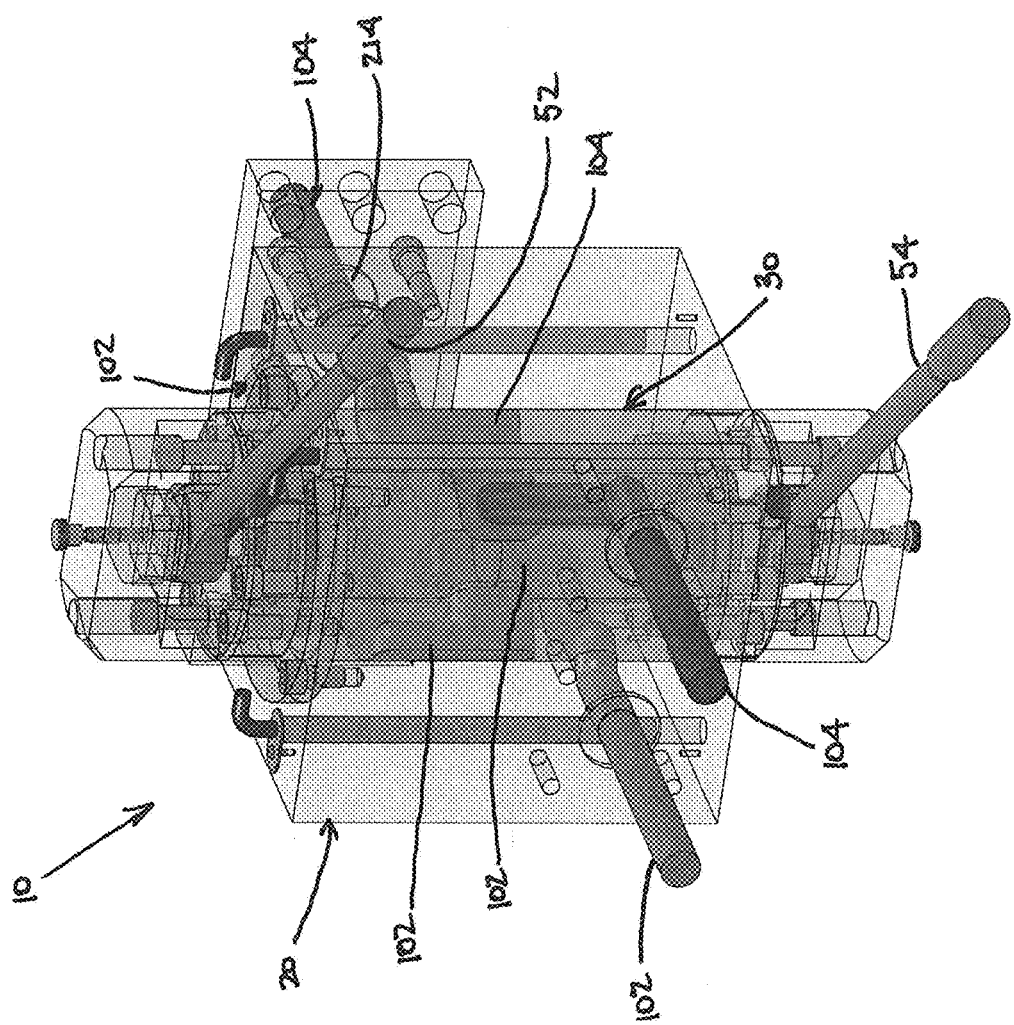
FIG. 1B is a view similar to FIG. 1 wherein components are shown semi-transparently to illustrate interior passages in the diverter valve.
Figure 2B:
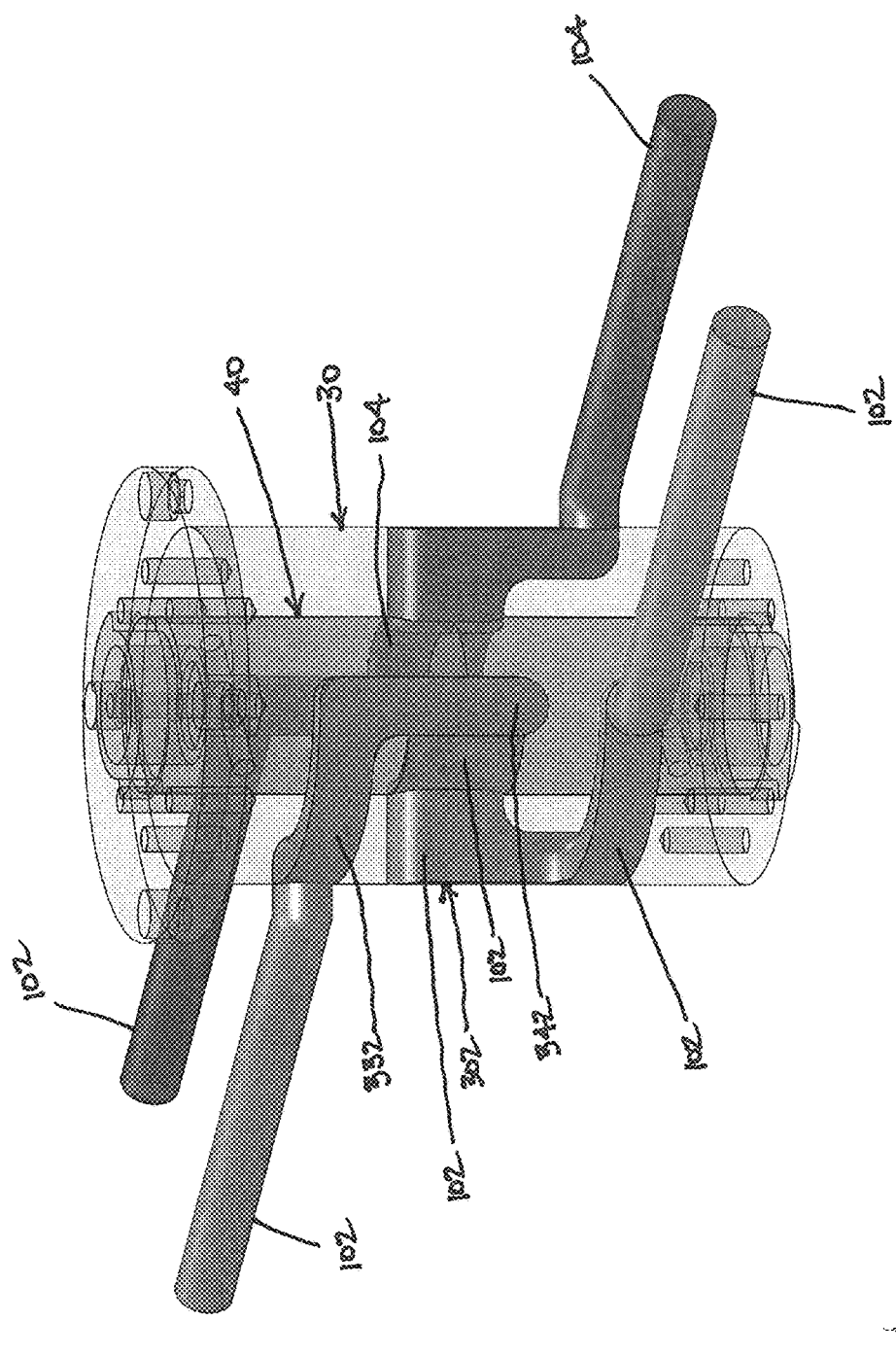
FIG. 2B is a view similar to FIG. 2A, but with the valve body removed.

While this invention is susceptible of embodiment in many different forms, this specification and the accompanying drawings disclose only one specific form as an example of the use of the invention. The invention is not intended to be limited to the embodiment so described.

For ease of description, the apparatus operating in accordance with this invention is described in the normal (upright) operating position, and terms such as upper, lower, horizontal, etc., are used with reference to this position.

The apparatus of this invention can have certain conventional components and control mechanisms the details of which, although not fully illustrated or described, will be apparent to those having skill in the art and an understanding of the necessary functions of such components and mechanisms.

Some of the Figures illustrating the preferred embodiment of the apparatus of the present invention show conventional structural details and mechanical elements or components that will be recognized by one skilled in the art. However, the detailed descriptions of such elements are not necessary to an understanding of the invention, and accordingly, are herein presented only to the degree necessary to facilitate an understanding of the novel features of the present invention.

The diverter valve 10 includes three main parts: a base or valve body 20 having a central opening 24 (see FIG. 5) cylindrical about an axis 26, a tubular body 30 in the valve body opening 24, and a split center cylinder 40 in the tubular body 30. While the described embodiment has cylindrical and pivoting components as further described herein, it should be appreciated that an advantageous diverter valve embodying the present invention may also be provided using flat components shifting or reciprocating in a linear direction.

The valve body 20 and the tubular body 30 are fixed relative to one another (and may be integral to one another, though it will be understood that convenience of manufacture will be facilitated by forming the tubular body 30 separate from the valve body 20).

The cylinder 40 includes two halves 42, 44 which may be independently pivoted within the tubular body 30. The cylinder halves 42, 44 each have flow path defining recesses at their adjacent ends, which recesses each extend over greater than 90 degrees around the cylinder halves 42, 44 as described in further detail below. Control rods 52, 54 (see FIG. 1A) may be pivoted about the axis 26 to control the position of the cylinder halves 42, 44, respectively.

The valve body 20 includes two input openings 202, 204 and two output openings 212, 214 therethrough, with the input openings 202, 204 spaced axially from the output openings 212, 214.

Description of the valve 10 will first be had with reference to FIGS. 1A-5, in which the two extruded materials 102, 104 pass through the valve 10 without crossing over, with material 102 entering input opening 202 and exiting through output opening 212, and material 104 entering input opening 204 and exiting through output opening 214

Material 102 flows through input opening 202 in valve body 20 to a recess 302 in the tubular body 30. The recess 302 defines a path between the valve body central opening 24 and the tubular body 30 which extends first annularly from the input opening 202 around the inside of the valve body central opening 24 (and the outside of the valve body 20) and then axially (i.e., in the direction of the axis of the cylindrical valve body and tubular body 30), with the upper end of the axially extending portion of the recess 302 having an axially extending tubular body output opening 312 through its inner side and open to the cylinder 40. The tubular body output opening 312 is at a height between the height of the valve body input openings 202, 204 and the valve body output openings 212, 214.

Material 104 flows through input opening 204 in valve body 20 to a recess 304 in the tubular body 30. The recess 304 defines a path between the valve body central opening 24 and the tubular body 30 which extends axially with the upper end of the axially extending portion of the recess 304 having an axially extending tubular body output opening 314 through its inner side and open to the cylinder 40. The tubular body output openings 312, 314 extend over substantially the same height and are aligned with each other.

It should be appreciated that the recesses 302, 304 serve to allow the tubular body output openings 312, 314 from the cylinder 40 to be on substantially opposite axial sides of the central axis 26 even though the input openings 202, 204 are not.

A second set of flow paths through the tubular body 30 also defined by recesses 332, 334 in the tubular body 30 are provided to allow flow from the interior of the tubular body 30 to the valve body output openings 212, 214. Each of these recesses 332, 334 has a tubular body interior opening 342, 344 from which material 102, 104 may flow from flow paths in the cylinder 40 (as described below) and then to the valve body output openings 212, 214. It should be appreciated that the recesses 332, 334 serve to allow the tubular body interior openings 342, 344 in the cylinder 40 to be on substantially opposite axial sides of the central axis 26 even though the connected output openings 212, 214 are not.

The interior openings 342, 344 extend axially so as to overlap in the axial direction the tubular body output openings 312, 314, at substantially equal 90 degree spacing around the axis 26.

Figure 4:
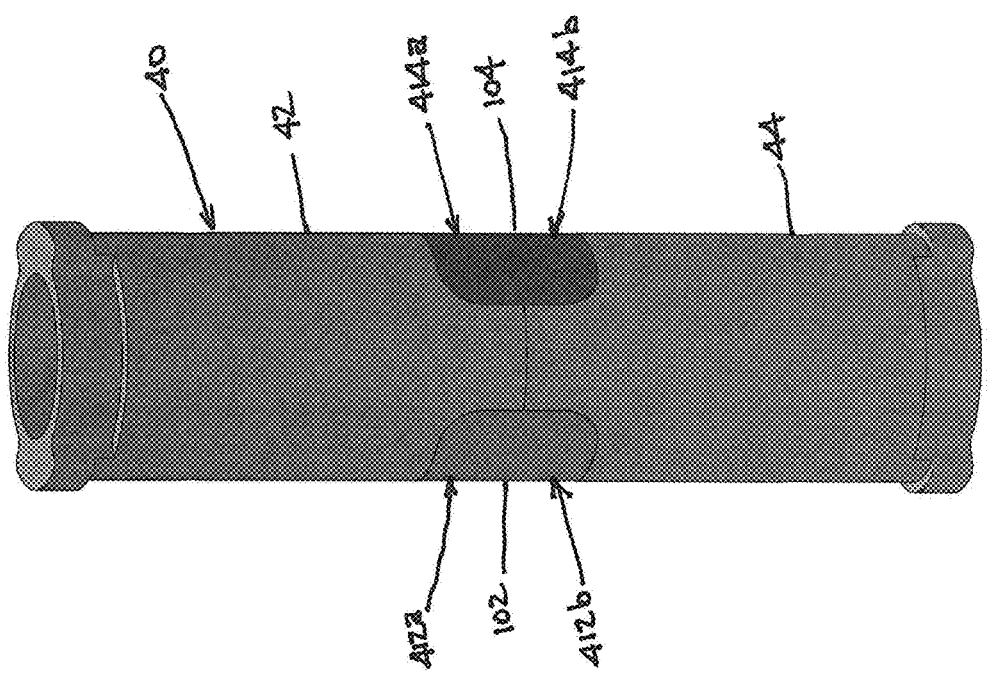
FIG. 4 is a view of the central cylinder of the diverter valve of FIG. 1.
Figure 7B:
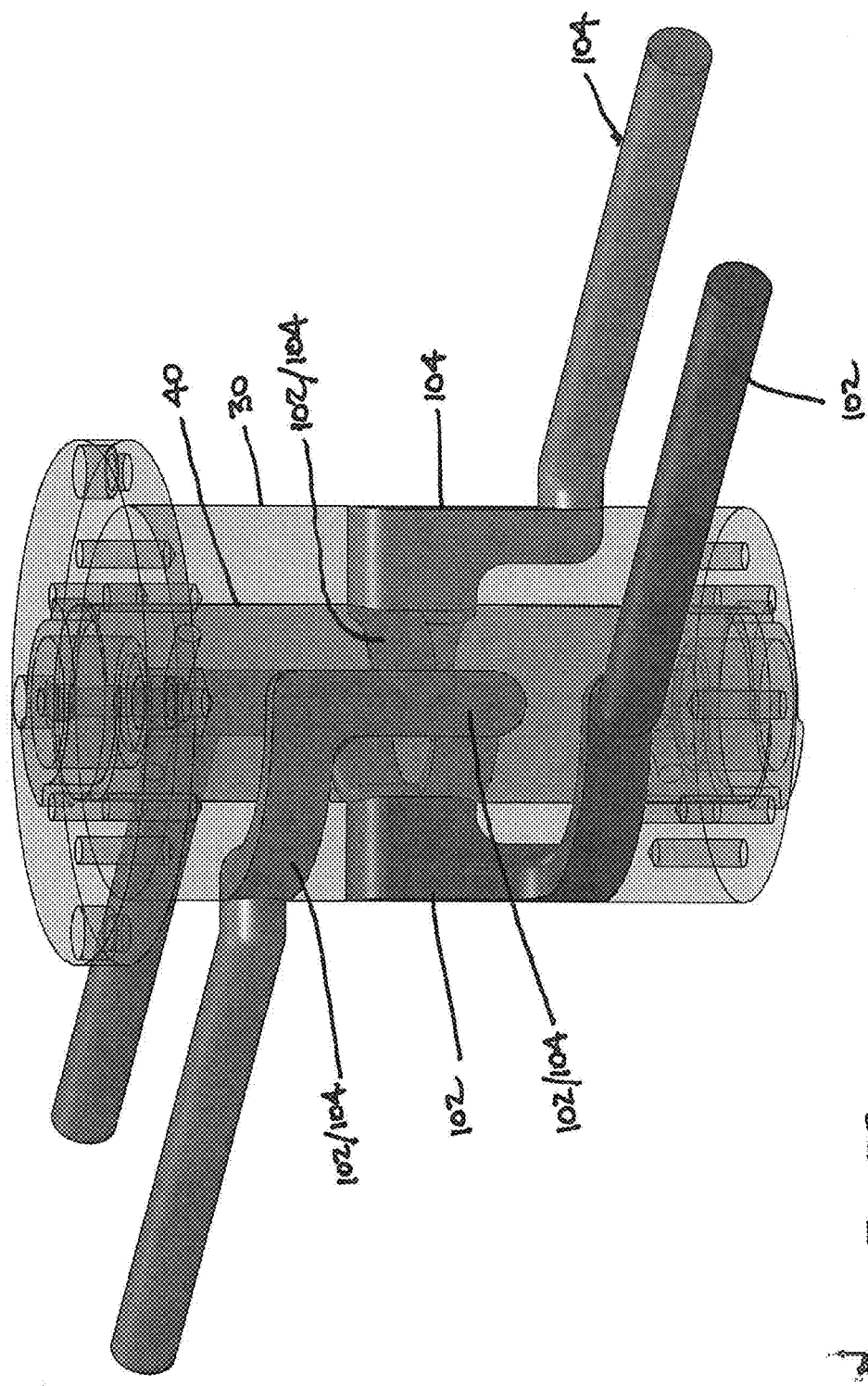
Figure 10A:
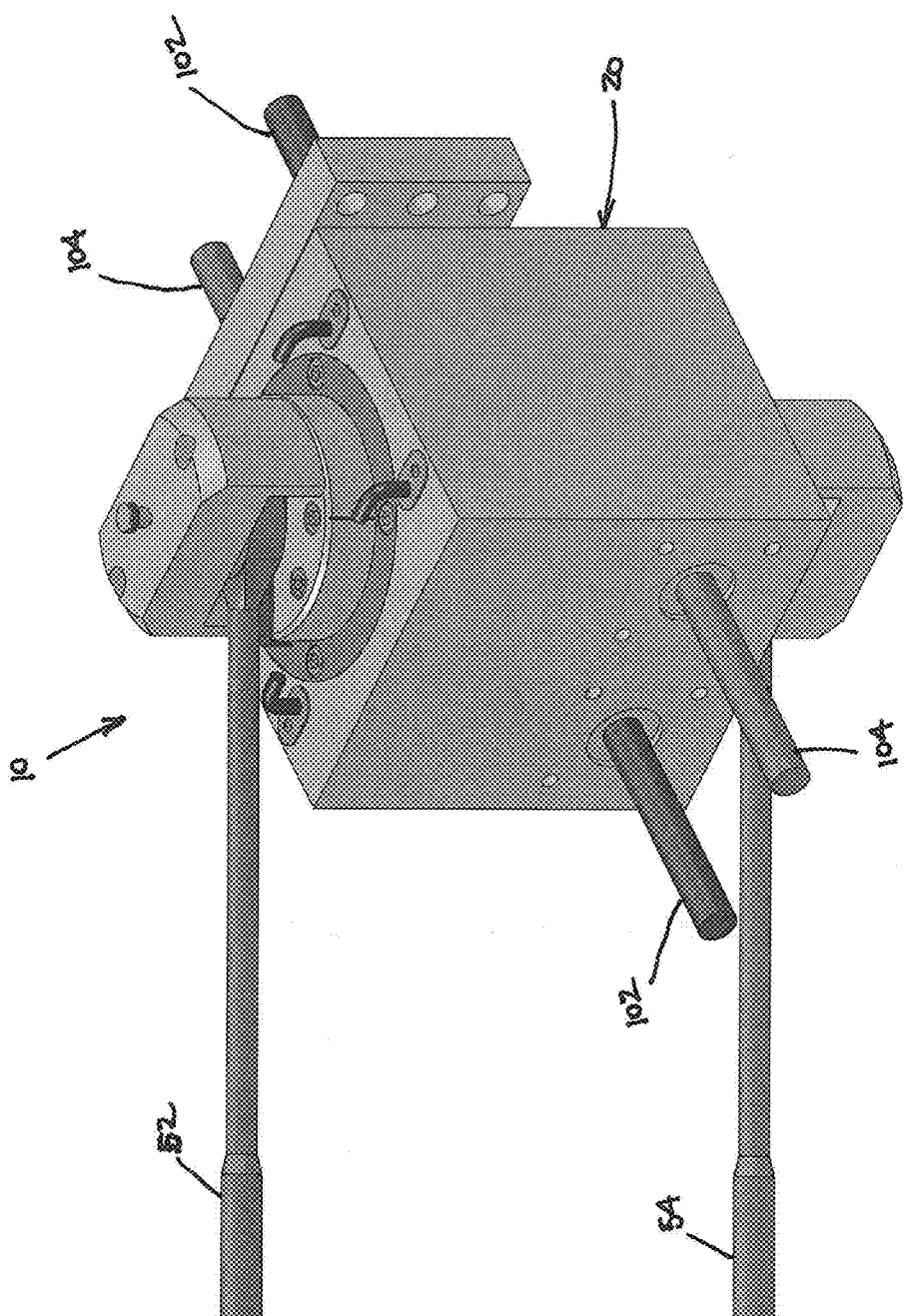
Figure 10B:
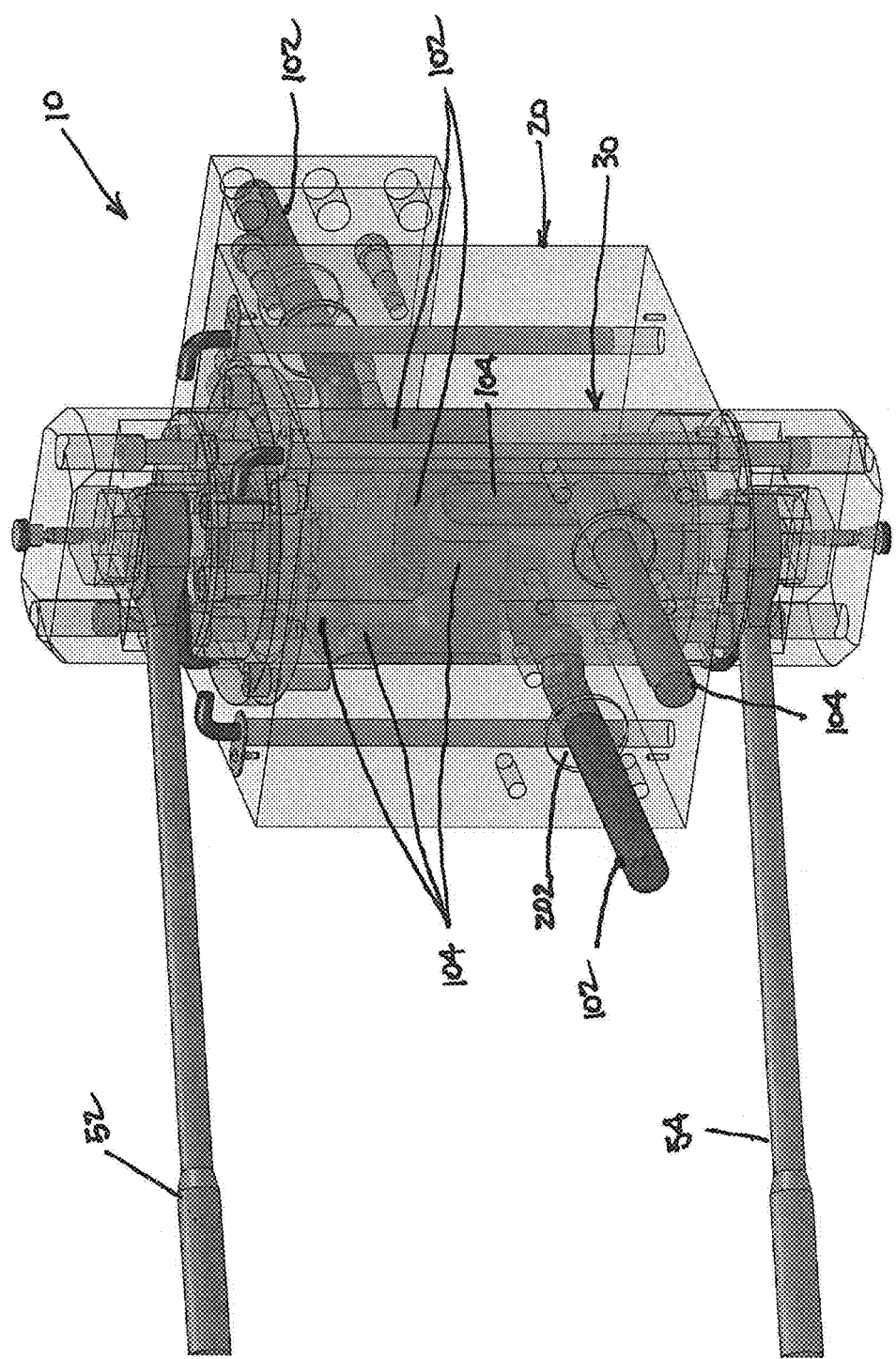
Figure 13:
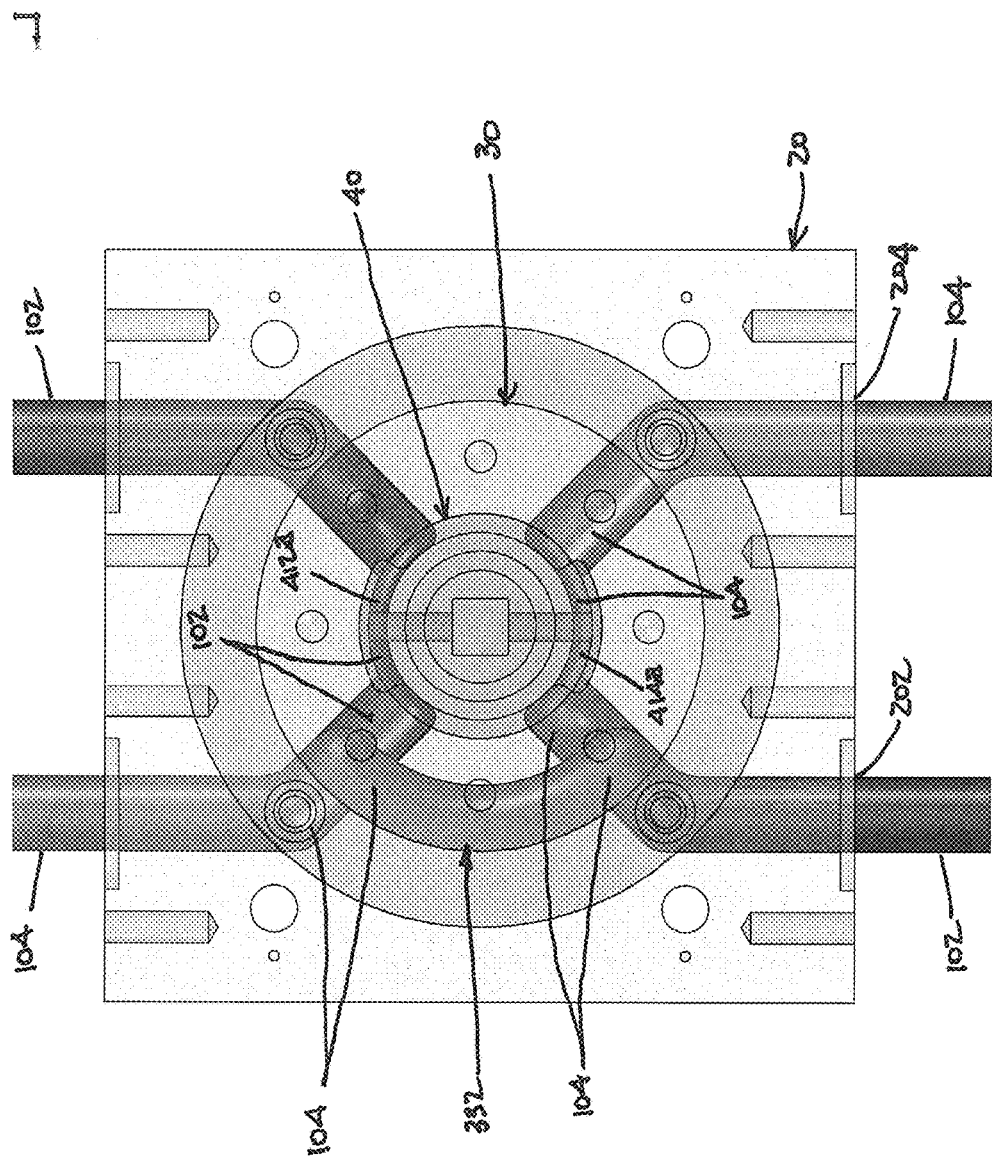

Control of flow from the tubular body output openings 312, 314 to the valve body output openings 212, 214 is controlled by the position of the two cylinder halves 42, 44. As previously noted, and as illustrated in FIGS. 4 and 6, the cylinder halves 42, 44 each have flow path defining recesses at their adjacent (vertical) ends. Specifically, the upper cylinder half 42 has recesses 412a, 414a on opposite sides of its lower end, each extending over greater than 90 degrees around the cylinder half 42. The lower cylinder half 44 has recesses 412b, 414b on opposite sides of its upper end, each also extending over greater than 90 degrees around the cylinder half 44. The recesses 412a-b, 414a-b are at the axial position (height) of the tubular body output openings 312, 314 and the tubular body interior openings 342, 344, so that in all angular positions of the cylinder halves 42, 44, each recess 412a-b, 414a-b overlies to at least one (in some configurations during transitioning, as described below), and during normal operation (and some transitioning configurations) two, of the tubular body output openings 312, 314 and tubular body interior openings 342, 344.

In the configuration illustrated in FIGS. 1A-5, the cylinder halves 42, 44 are in the position illustrated in FIG. 4, with recesses 412a, 412b aligned with each other and recesses 414a, 414b aligned with each other. Moreover, in that configuration, the recesses 412a, 412b are aligned at opposite ends with the tubular body output opening 312 of the tubular body 30 and the output opening 212 of the valve body 20 so that material 102 will flow through the path between the recesses 412a, 412b and the inner surface of the tubular body 30 from tubular body output opening 312 to valve body output opening 212, and from there to one side of the mold(s). Similarly, in that configuration, the recesses 414a, 414b are aligned at opposite ends with the output opening 314 of the tubular body 30 and the output opening 214 of the valve body 20 so that material 104 will flow through the path between the recesses 414a, 414b and the inner surface of the tubular body 30 from tubular body output opening 314 to valve body output opening 214, and from there to the other side of the mold(s).

Transitioning of the valve 10 as it is moved to the cross-over position (illustrated in FIGS. 10A-13 and discussed below) is shown in FIGS. 6-9. Such transition occurs as the valve 10 is shifted from the materials 102, 104 flowing from input openings 202, 204 to output openings 212, 214, respectively, to the cross-over configuration in which the materials 102, 104 flow from input openings 202, 204 to opposite output openings 214, 212, respectively.

During such transitioning, one of the cylinder halves (e.g., upper half 42) is first pivoted through 90 degrees, to the configuration shown in FIG. 6 where the recesses 412a, 414a in the pivoted half 42 span between the recesses 412b, 414b as illustrated in FIG. 6, recess 414a spans between recess 412b and recess 414b, and on the opposite side [not seen], recess 414b also spans between recess 412b and 414b). It should be appreciated that as that pivoting occurs, the recesses in the pivoting half 42 will to varying degrees open in their opposite ends to both recesses 412b, 414b in the other half 44 until, when fully pivoted, there will effectively be a generally sinuous open path completely around the outside of the cylinder 40 (see FIG. 6) wherein both extruded materials 102, 104 exiting tubular body output openings 312, 314 may flow either way. Thus, in this transition, mixes of materials 102/104 will flow through the cylinder recesses 412a, 412b, 414a and 414b and out both valve body output openings 212, 214.

At this point in the transition, recess 414a of the pivoted cylinder half 42 has been shifted from the initial position (FIGS. 1A-5) to a position in which it is on one end (but its opposite end) still open to tubular body output opening 314 but on the other end instead is open to (aligned with) valve body output opening 212 (rather than opening 214). Similarly, recess 412a of the pivoted cylinder half 42 has been shifted from the initial position to a position in which it is on one end (but its opposite end) still open to tubular body output opening 312 and on the other end instead is open to valve body output opening 214 (rather than opening 212).

Transitioning to the cross-over configuration (illustrated in FIGS. 10A-13) is then completed by pivoting the other cylinder half (e.g., lower half 44) through 90 degrees, wherein the recesses 412b, 414b will again line up fully with upper half recesses 412a, 414a, respectively, to define two separate closed flow paths. In this configuration the closed flow path of recesses 414a, 414b connect tubular body output opening 314 to valve body output opening 212, and the closed flow path of recesses 412a, 412b connect tubular body output opening 312 to valve body output opening 214.

Transitioning the configuration of the valve 10 back to the original configuration of FIGS. 1A-5 is simply a reversal of the above described transition.

It should be appreciated that at all times, including during transitioning, at no point is flow of either material 102, 104 into, through, and/or out of the valve 10 blocked, thereby allowing advantageous continuous operation without dead (i.e., periodically non-flowing) channels and stagnant polymers (which can degrade should it be temporarily stagnant). Thus, undesirable flow channel restrictions, flow stoppage, undesirable pressure spikes and/or defects in the molded articles resulting from degraded polymers can be avoided.

It should similarly be appreciated that the diverter valve disclosed herein uses all flow channels continuously. That is, extruded material will flow through all of the flow channels at all times in all states of the valve, with there being no dead channels and/or places where the flow of material will even temporarily stop, and therefore no place for the extruded material to stagnate.

It should still further be appreciated that in one alternate form the cylinder could be solid (i.e., unitary and not two halves), with two recesses defining separate flow paths (separated, e.g., axially). Advantageously, as with the illustrated split cylinder 40, rotation of such a unitary cylinder would cause the recesses to shift so that each recess connects a flow inlet to one or the other flow outputs, or the connects a flow output to one or the other flow inlets. That is, each recess may be associated with one flow inlet and rotated to divert flow to one or the other flow outputs, or alternatively each recess may be associated with one flow output and rotated to change between connecting to one or the other flow inlet). Moreover, the recesses of such a unitary cylinder advantageously extend sufficiently around the cylinder periphery so that when transitioning between, for example, flow inlets, the recess will connect to (i.e., be open to) the new output to which it is changing before it disconnects from (i.e., is no longer open to) the output from which it is changing. It should be appreciated that by ensuring a constant, uninterrupted flow of extruded material through all flow paths, even as the flow paths change, dead channels which could house stagnant polymer will be eliminated, as will the undesirable effects of stagnant polymer such as blocking or reducing flow channels, defects in the molded articles, and pressure spikes.

The invention claimed is:

1. A diverter valve for controlling input of supplies of first and second extruded materials to a mold, comprising:
   a base having
      a central opening cylindrical about an axis,
      a first inlet for first extruded material and a second inlet for second extruded material,
      a first outlet adapted to output extruded material to a first mold inlet and a second outlet adapted to output extruded material to a second mold inlet,
      said base defining
         a first flow path adapted to carry the first extruded material from said first inlet to a first output opening,
         a second flow path adapted to carry a second extruded material from said second inlet to a second output opening,
         a third flow path adapted to carry extruded material from a first inlet opening to said first outlet, and
         a fourth flow path adapted to carry extruded material from a second inlet opening to said second outlet,
         wherein said first and second inlet openings and said first and second output openings are axially open to said central opening; and
      a cylinder pivotable about said axis in said base cylindrical central opening, said cylinder having first and second recesses around its outer surface axially aligned with said first and second inlet openings and said first and second output openings;
      wherein when extruded material is supplied to said diverter valve, said material constantly flows through the entirety of the first, second, third and fourth flow paths and said first and second recesses.

2. The diverter valve of claim 1, wherein said cylinder has first and second halves independently pivotable about said axis in said base cylindrical central opening, said cylinder halves being adjacent along a plane substantially radial to said central opening axis with each of said cylinder halves including a recess open along said radial plane.

3. The diverter valve of claim 1, wherein said base first and second output openings and said base first and second inlet openings axially overlap said cylinder recesses.

4. The diverter valve of claim 1, wherein said base first and second output openings are open to opposite sides of said central opening.

5. The diverter valve of claim 1, wherein said base first and second inlet openings are open to opposite sides of said central opening.

6. The diverter valve of claim 5, wherein said first and second output openings are open to opposite sides of said central opening and spaced around said base central opening substantially equally between said first and second inlet openings.

7. The diverter valve of claim 1, wherein said base comprises a tubular body inside a valve body wherein said tubular body inner surface is said cylindrical opening and said flow paths are in part defined by space between said tubular body and said valve body.

8. A diverter valve for controlling input of supplies of first and second extruded materials to a mold, comprising:
   a base having
      central opening cylindrical about an axis,
      a first inlet for first extruded a rid a second inlet for second extruded material,
      a first outlet adapted to output extruded material to a first mold inlet and a second outlet adapted to output exuded material to a second mold inlet,
      said base defining
         a first flow path adapted to carry the first extruded material from said first inlet to a first output opening, a second flow path adapted to carry a second extruded material from said second inlet to a second output opening, a third flow path adapted to carry extruded material from a first inlet opening to said first outlet, and a fourth flow path adapted to carry extruded material from a second inlet opening to said second outlet, wherein said and second inlet openings and said first and second output openings are axially open to said central opening; and cylinder pivotable about said axis in said base cylindrical central opening, said cylinder having first and second recesses around its outer surface axially aligned with said first and second inlet openings and said first and second output openings;

wherein said cylinder is rotatable between first and second states;

said first recess is open to said first output opening, and extends around said cylinder sufficiently whereby:

in said first state said first recess is open to the first inlet opening, in said second state said first recess is open to said second inlet opening, when transitioning from said first state to said second state said first recess becomes open to said second inlet opening before closing from said first inlet opening, and when transitioning from said second state to said first state said first recess becomes open to said first inlet opening before closing from said second inlet opening, and said second recess is open to said second output opening, and extends around said cylinder sufficiently whereby in said first state said second recess is open to the second inlet opening, in said second state said second recess is open to said first inlet opening, when transitioning from said first state to said second state said second recess becomes open to said first inlet opening before closing from said second inlet opening, and when transitioning from said second state to said first state becomes open to said second inlet opening before closing from said first inlet opening.

9. A diverter valve for controlling input of supplies of first and second extruded materials to a mold, comprising:

a base having a central opening cylindrical about an axis, a first inlet for first extruded material and a second inlet for second extruded material, first outlet adapted to output extruded material to a first mold inlet and a second outlet adapted to output extruded material to a second mold inlet, said base defining a first flow path adapted to carry the first extruded material from said first inlet to a first output opening, a second flow path adapted to carry a second extruded material from said second inlet to a second output opening, a third flow path adapted to carry extruded material from a first inlet opening to said first outlet, and a fourth flow path adapted to carry extruded material from a second inlet opening to said second outlet, wherein said first and second inlet openings and said first and second output openings are axially open to said central opening; and a cylinder pivotable about said axis in said base cylindrical central opening, said cylinder having first and second recesses around its outer surface axially aligned with said first and second inlet openings and said first and second output openings;

wherein said cylinder is rotatable between first and second states;

said first recess is open to said first inlet opening, and extends around said cylinder sufficiently whereby:

in said first state said first recess is open to the first output opening, in said second state said first recess is open to said second output opening, when transitioning from said first state to said second state said first recess becomes open to said second output opening before closing from said first output opening, and when transitioning from said second state to said first state said first recess becomes open to said first output opening before closing from said second output opening, and said second recess is open to said second inlet opening, and extends around said cylinder sufficiently whereby in said first state said second recess is open to the second output opening, in said second state said second recess is open to said first output opening, when transitioning from said first state to said second state said second recess becomes open to said first output opening before closing from said second output opening, and when transitioning from said second state to said first state becomes open to said second output opening before closing from said first output opening.

10. A diverter valve for controlling input of supplies of first and second extruded materials to a mold, comprising:

a base having a central opening cylindrical about an axis, a first inlet for first extruded material and a second inlet for second extruded material, a first outlet adapted to output extruded material to a first mold inlet and a second outlet adapted to output extruded material to a second mold inlet, said base defining a first flow path adapted to carry the first extruded material from said first inlet to a first output opening, a second flow path adapted to carry a second extruded material from said second inlet to a second output opening, a third flow path adapted to carry extruded material from a first inlet opening to said first outlet, and fourth flow path adapted to carry extruded material from a second inlet opening to said second outlet, wherein said first and second inlet openings and said first and second output openings are axially open to said central opening; and a cylinder pivotable about said axis in said base cylindrical central opening, said cylinder having first and second recesses around its outer surface axially aligned with said first and second inlet openings and said first and second output opening;

wherein
said base first and second output openings and said base first and second inlet openings axially overlap said cylinder recesses, and
said inlets are axially spaced on one side of said cylinder recesses and said outlets are axially spaced on the other side of said cylinder recesses.

11. A diverter valve for controlling input of supplies of first and second extruded materials to a mold, comprising:
a base having
a central opening cylindrical about an axis,
a first inlet for first extruded material and a second inlet for second extruded material,
outlet adapted to output extruded material to a first mold inlet and a second outlet adapted to output extruded material to a second mold inlet,
said base defining
a first flow path adapted to carry the first extruded material from said first inlet to a first output opening,
a second flow adapted to carry a second extruded material from said second inlet to a second output opening,
a third flow path adapted to carry extruded material inlet opening to said first outlet, and
a fourth flow path adapted to carry extruded material from a second inlet opening to said second outlet,
wherein said first and second inlet openings and said first and second putout openings are axially open to said central opening; and
a cylinder pivotable about said axis in said base cylindrical central opening, said cylinder having first and second recesses around its outer surface axially aligned with said first and second inlet openings and said first and second output openings;
wherein said cylinder recesses extend more than 180 degrees around said cylinder.

12. A diverter valve for controlling input of supplies of first and second extruded materials to mold, comprising:
a base having
a central opening cylindrical about an axis,
a first inlet for first extruded material and a second inlet for second extruded material,
a first outlet adapted to output extruded material to a first mold inlet and a second outlet adapted to output extruded material to a second mold inlet,
said base defining
a first flow path adapted to carry the first extruded material from said first inlet to a first output opening,
a second flow path adapted to carry a second extruded material from said second inlet to a second output opening,
a third flow path adapted to carry extruded material from a first inlet opening to said first outlet, and
a fourth flow path adapted to carry extruded material from a second inlet opening to said second outlet,
wherein said first and second inlet openings and said first and second output openings are axially open to said central opening, and
a cylinder pivotable about said axis in said base cylindrical central opening, said cylinder having first and second recesses around its outer surface axially aligned with said first and second inlet openings and said first and second output openings;
wherein
said cylinder has first and second halves independently pivotable about said axis in said base cylindrical central opening, said cylinder halves being adjacent along a plane substantially radial to said central opening axis with each of said cylinder halves including a recess open along said radial plane, and
said first and second cylinder halves are selectively pivotable to selectively connect each of said first and second flow paths with at least one of said third and fourth flow paths.

13. A diverter valve for controlling input of supplies of first and second extruded materials to a mold, comprising:
a base having
central opening cylindrical about an axis,
a first inlet for first extruded material and a second inlet for second extruded material,
a first outlet adapted to output extruded material to a first mold inlet and a second outlet adapted to output extruded material to a second mold inlet,
said base defining
a first flow path adapted to carry the first extruded material from said first inlet to a first output opening,
second flow path adapted to carry a second extruded material from said second inlet to a second output opening,
a third path adapted to carry extruded material from a first inlet opening to said first outlet, and
a fourth flow path adapted to carry extruded material from a second inlet opening to said second outlet,
wherein said first and second inlet openings and said first and second output openings are axially open to said central opening; and
a cylinder pivotable about said axis in said base cylindrical central opening, said cylinder having first and second recesses around its outer surface axially aligned with said first and second inlet openings and said first and second output openings;
wherein the valve is configured to change between:
a) a first state wherein said first inlet is connected to said first outlet and said second inlet is connected to said second outlet, and
b) a second state wherein said first inlet is connected to said second outlet and said second inlet is connected to said first outlet;
wherein said diverter valve is configured so that
when switching said diverter valve from said first state to said second state,
said first inlet is connected to said second outlet before disconnecting from said first outlet, and
said second inlet is connected to said first outlet before disconnecting from said second outlet; and
when switching said diverter valve from said second state to said first state,
said first inlet is connected to said first outlet before disconnecting from said second outlet, and
said second inlet is connected to said second outlet before disconnecting from said first outlet.

14. The diverter valve of claim 13, wherein said cylinder recesses are aligned with one another when said valve is in either of said first and second states.

15. The diverter valve of claim 14, wherein said cylinder has first and second halves independently pivotable about said axis in said base cylindrical central opening, said cylinder halves being adjacent along a plane substantially radial to said central opening axis with each of said cylinder halves including a recess open along said radial plane, said cylinder halves being pivotable through 90 degrees, whereby when switching said diverter valve from the first state to the second state, one of said cylinder halves is first pivoted 90 degrees in one direction and the other of said cylinder halves is thereafter pivoted 90 degrees in said one direction; and when switching said diverter valve from the second state to first state, one of said cylinder halves is first pivoted 90 degrees in the direction opposite said one direction and the other of said cylinder halves is thereafter pivoted 90 degrees in said opposite direction.

* * * * *

UNITED STATES PATENT AND TRADEMARK OFFICE
CERTIFICATE OF CORRECTION

PATENT NO.       : 10,207,444 B2
APPLICATION NO.  : 15/048456
DATED            : February 19, 2019
INVENTOR(S)      : Dana R. Hanson et al.

Page 1 of 1

It is certified that error appears in the above-identified patent and that said Letters Patent is hereby corrected as shown below:

In the Claims

Claim 8, Column 10, Line 58, before "central" insert --a--;
    Column 10, Line 59, delete "a rid" and substitute therefor --material and--;
    Column 10, Line 63, delete "exuded" and substitute therefor --extruded--;
    Column 11, Line 8, after "wherein said" insert --first--; and
    Column 11, Line 11, before "cylinder" insert --a--.

Claim 9, Column 11, Line 53, before "first" insert --a--.

Claim 10, Column 12, Line 58, before "fourth" insert --a--; and
    Column 12, Line 67, delete "opening" and substitute therefor --openings--.

Claim 11, Column 13, Line 14, before "outlet" insert --a first--;
    Column 13, Line 21, after "flow" insert --path--;
    Column 13, Line 25, before "inlet" insert --from a first--; and
    Column 13, Line 29, delete "putout" and substitute therefor --output--.

Claim 12, Column 13, Line 39, before "mold" insert --a--.

Claim 13, Column 14, Line 14, before "central" insert --a--;
    Column 14, Line 24, before "second" insert --a--; and
    Column 14, Line 27, after "third" insert --flow--.

Signed and Sealed this
Thirtieth Day of April, 2019

Andrei Iancu
*Director of the United States Patent and Trademark Office*